US012683636B2

(12) United States Patent
Hoversten et al.

(10) Patent No.: US 12,683,636 B2
(45) Date of Patent: Jul. 14, 2026

(54) DIGITAL PRE-DISTORTION FOR RF TRANSMITTERS USING RECONFIGURABLE MATCHING NETWORKS

(71) Applicant: Murata Manufacturing Co., Ltd., Kyoto (JP)

(72) Inventors: John R. Hoversten, Arlington, MA (US); Ty Lewis, Umeå (SE); Thomas Renstrom, Tyresö (SE); Yevgeniy A. Tkachenko, Belmont, MA (US)

(73) Assignee: Murata Manufacturing Co., Ltd., Kyoto (JP)

( * ) Notice: Subject to any disclaimer, the term of this patent is extended or adjusted under 35 U.S.C. 154(b) by 2 days.

(21) Appl. No.: 18/735,627

(22) Filed: Jun. 6, 2024

(65) Prior Publication Data

US 2024/0429952 A1 Dec. 26, 2024

Related U.S. Application Data

(60) Provisional application No. 63/509,348, filed on Jun. 21, 2023.

(51) Int. Cl.
H04B 1/04 (2006.01)
(52) U.S. Cl.
CPC ... H04B 1/0475 (2013.01); H04B 2001/0425 (2013.01)
(58) Field of Classification Search
CPC ..................... H04B 1/0475; H04B 2001/0425
See application file for complete search history.

(56) References Cited

U.S. PATENT DOCUMENTS 7,746,041 B2 6/2010 Xu et al.
7,777,459 B2 8/2010 Williams
(Continued)

FOREIGN PATENT DOCUMENTS

CN 113196652 7/2021
EP 3 598 641 A2 1/2020
(Continued)

OTHER PUBLICATIONS

U.S. Appl. No. 17/131,150, filed Dec. 22, 2020, Chen, et al.
(Continued)

*Primary Examiner* — Dac V Ha
(74) *Attorney, Agent, or Firm* — Daly, Crowley, Mofford & Durkee, LLP

(57) ABSTRACT

According to some embodiments, in a radio frequency (RF) transceiver system having a transmit chain and a digital pre-distorter (DPD), a control unit includes: one or more inputs, at least one of which is connected to receive a first signal corresponding to a signal to be transmitted via the transmit chain or a modified version of the signal to be transmitted; and an output connected to provide a control signal to the DPD, and to a reconfigurable matching network (RMN) for commanding a reconfiguration of the RMN, wherein the DPD is configured to apply digital predistortion to the signal to be transmitted based at least in part on combining the first signal with a second signal corresponding to the control signal or a translated version thereof, and to provide a resulting pre-distorted signal to the transmit chain.

57 Claims, 18 Drawing Sheets

100

(56)  References Cited

U.S. PATENT DOCUMENTS

| | | | |
|---|---|---|---|
| 7,782,027 B2 | 8/2010 | Williams | |
| 7,786,712 B2 | 8/2010 | Williams | |
| 7,812,579 B2 | 10/2010 | Williams | |
| 7,977,927 B2 | 7/2011 | Williams | |
| 8,212,541 B2 | 7/2012 | Perreault et al. | |
| 8,824,978 B2 | 9/2014 | Briffa et al. | |
| 8,829,993 B2 | 9/2014 | Briffa et al. | |
| 8,830,709 B2 | 9/2014 | Perreault et al. | |
| 8,830,710 B2 | 9/2014 | Perreault et al. | |
| 8,860,396 B2 | 10/2014 | Giuliano | |
| 8,957,727 B2 | 2/2015 | Dawson et al. | |
| 8,976,896 B2 | 3/2015 | McCallister et al. | |
| 9,020,453 B2 | 4/2015 | Briffa et al. | |
| 9,160,287 B2 | 10/2015 | Briffa et al. | |
| 9,166,536 B2 | 10/2015 | Briffa et al. | |
| 9,172,336 B2 | 10/2015 | Briffa et al. | |
| 9,209,758 B2 | 12/2015 | Briffa et al. | |
| 9,438,172 B2 | 9/2016 | Cohen | |
| 9,490,752 B2 | 11/2016 | Briffa et al. | |
| 9,531,291 B2 | 12/2016 | Perreault | |
| 9,537,456 B2 | 1/2017 | Briffa et al. | |
| 9,634,577 B2 | 4/2017 | Perreault | |
| 9,735,814 B1* | 8/2017 | Jin | H03F 1/3247 |
| 9,755,672 B2 | 9/2017 | Perreault et al. | |
| 9,768,731 B2 | 9/2017 | Perreault et al. | |
| 9,768,732 B2 | 9/2017 | Briffa et al. | |
| 9,917,517 B1 | 3/2018 | Jiang et al. | |
| 9,979,421 B2 | 5/2018 | Astrom et al. | |
| 10,075,201 B1 | 9/2018 | Gazneli et al. | |
| 10,164,577 B2 | 12/2018 | Briffa et al. | |
| 10,171,041 B2 | 1/2019 | Dzhigan et al. | |
| 10,193,441 B2 | 1/2019 | Giuliano | |
| 10,389,235 B2 | 8/2019 | Giuliano | |
| 10,469,109 B2 | 11/2019 | Gutman et al. | |
| 10,541,657 B2 | 1/2020 | Gutman et al. | |
| 10,658,981 B2 | 5/2020 | Briffa et al. | |
| 10,917,051 B2 | 2/2021 | Kushnir | |
| 10,931,320 B2 | 2/2021 | Megretski et al. | |
| 10,992,265 B2 | 4/2021 | Hoversten et al. | |
| 11,012,105 B2 | 5/2021 | Langer et al. | |
| 11,043,918 B2 | 6/2021 | Tanaka et al. | |
| 11,121,684 B2 | 9/2021 | Henzler et al. | |
| 11,191,028 B2 | 11/2021 | Hoversten et al. | |
| 11,245,367 B2 | 2/2022 | Garrett et al. | |
| 11,558,014 B2 | 1/2023 | Tanaka et al. | |
| 11,637,531 B1 | 4/2023 | Perreault et al. | |
| 11,664,727 B2 | 5/2023 | Giuliano et al. | |
| 11,757,411 B2 | 9/2023 | Tanaka et al. | |
| 11,863,210 B2 | 1/2024 | Megretski et al. | |
| 11,942,904 B2 | 3/2024 | Zhao et al. | |
| 2002/0008578 A1 | 1/2002 | Wright et al. | |
| 2003/0058959 A1* | 3/2003 | Rafie | H04L 27/368 375/296 |
| 2006/0133536 A1 | 6/2006 | Rexberg | |
| 2009/0033418 A1 | 2/2009 | Ericson et al. | |
| 2009/0054016 A1 | 2/2009 | Waheed et al. | |
| 2009/0227215 A1 | 9/2009 | McCallister | |
| 2011/0098011 A1 | 4/2011 | Camp, Jr. et al. | |
| 2012/0321018 A1* | 12/2012 | Chen | H03F 1/3241 375/296 |
| 2013/0259159 A1 | 10/2013 | McCallister et al. | |
| 2014/0133602 A1* | 5/2014 | Mujica | H03F 3/195 375/296 |
| 2014/0292406 A1 | 10/2014 | Dechen et al. | |
| 2015/0236729 A1 | 8/2015 | Peng et al. | |
| 2017/0005627 A1* | 1/2017 | Zhao | H03F 3/24 |
| 2017/0005676 A1 | 1/2017 | Yan et al. | |
| 2018/0262220 A1 | 9/2018 | Jimenez et al. | |
| 2019/0074797 A1 | 3/2019 | Briffa et al. | |
| 2019/0089389 A1 | 3/2019 | Gutman et al. | |
| 2019/0394016 A1 | 12/2019 | Boos | |
| 2020/0259465 A1 | 8/2020 | Wu et al. | |
| 2021/0288614 A1 | 9/2021 | Hoversten et al. | |
| 2021/0385752 A1 | 12/2021 | Hoversten et al. | |
| 2022/0021349 A1 | 1/2022 | Yan | |
| 2022/0131463 A1 | 4/2022 | Giuliano et al. | |
| 2022/0149725 A1 | 5/2022 | Garrett et al. | |
| 2022/0416726 A1 | 12/2022 | Asbeck et al. | |
| 2023/0054485 A1 | 2/2023 | Hoversten et al. | |
| 2023/0056740 A1 | 2/2023 | Perreault et al. | |
| 2023/0057037 A1 | 2/2023 | Hoversten et al. | |
| 2023/0370937 A1* | 11/2023 | Kim | H04W 24/02 |
| 2023/0421111 A1 | 12/2023 | Khlat et al. | |
| 2024/0014833 A1* | 1/2024 | Henzler | H03F 3/19 |

FOREIGN PATENT DOCUMENTS

| | | |
|---|---|---|
| EP | 3 721 567 B1 | 11/2022 |
| WO | WO 2019/117888 57 | 6/2019 |
| WO | WO 2019/117888 A1 | 6/2019 |
| WO | WO 2021/046453 A1 | 3/2021 |

OTHER PUBLICATIONS

Cao, et al.; "A Family of Zero Current Switching Switched-Capacitor DC-DC Converters"; 2010 Twenty-Fifth Annual IEEE Applied Power Electronics Conference and Exposition (APEC); Feb. 21-25, 2010; 8 Pages.

Cao, et al.; "Multiphase Multilevel Modulator DC-DC Converter for High-Current High-Gain TEG Application"; IEEE Transactions on Industry Application; vol. 47; No. 3; May/Jun. 2011; 9 Pages.

Chen, et al; "A High Efficiency High Power Step-Up Resonant Switched-Capacitor"; 2012 IEEE Energy Conversion Congress and Exposition (ECCE); Sep. 15-20, 2012; 5 Pages.

Shoyama, et al.; "Resonant Switched Capacitor Converter with High Efficiency"; 2004 35$^{th}$ Annual IEEE Power Electronics Specialists Conference; 2004; 7 Pages.

Sun, et al.; "High Power Density, High Efficiency System Two-Stage Power Architecture for Laptop Computers"; 2006 37th IEEE Power Electronics Specialists Conference; Jun. 18-22, 2006; 7 Pages.

Unknown; "Fundamentals of Power Electronics"; Chapter 19: Resonant Conversion; Sep. 19, 2019; 87 Pages.

Yeung, et al.; "Multiple and Fractional Voltage Conversion Ratios for Switched-capacitor Resonant Converters"; 2001 IEEE 32nd Annual Power Electronics Specialists Conference (IEEE Cat. No. 01CH37230); Jun. 17-21, 2001; 6 Pages.

Wood, "Digital Pre-Distortion of RF Power Amplifiers: Progress to Date and Future Challenges"; 2015 IEEE MTT-S International Microwave Symposium; May 2015; 3 pages.

International Search Report and Written Opinion dated Oct. 25, 2024, for PCT Application No. PCT/US2024/034288; 17 pages.

International Search Report and Written Opinion dated Dec. 9, 2024, for PCT Application No. PCT/US2024/034294; 22 pages.

International Search Report and Written Opinion dated Dec. 3, 2024, for PCT Application No. PCT/US2024/034300; 22 pages.

International Search Report and Written Opinion dated Oct. 1, 2024, for PCT Application No. PCT/US2024/034306; 14 pages.

International Search Report and Written Opinion dated Oct. 17, 2024, for PCT Application No. PCT/US2024/034314; 16 pages.

International Search Report and Written Opinion dated Sep. 30, 2024, for PCT Application No. PCT/US2024/034317; 11 pages.

International Search Report and Written Opinion dated Oct. 1, 2024, for PCT Application No. PCT/US2024/034324; 14 pages.

Gilabert et al., "Digital Predisorters Go Multidimensional: DPD for Concurrent Multiband Envelope Tracking and Outphasing Power Amplifiers"; IEEE Microwave Magazine, vol. 20, No. 5; May 2019; 12 pages.

Cao et al., "Linearization of Efficiency-Optimized Dynamic Load Modulation Transmitter Architectures"; IEEE Transactions on Microwave Theory and Techniques, vol. 58, No. 4; Apr. 2010; 9 pages.

Sanchez-Perez et al., "Dynamic Load Modulation With a Reconfigurable Matching Network for Efficiency Improvement Under Antenna Mismatch"; IEEE Transactions on Circuits and Systems—II: Express Briefs, vol. 58, No. 12; Dec. 2011; 5 pages.

Tervo et al., "Combined Sidelobe Reduction and Omnidirectional Linearization of Phased Array by Using Tapered Power Amplifier

(56) References Cited

OTHER PUBLICATIONS

Biasing and Digital Predistortion"; IEEE Transactions on Micro-wave Theory and Techniques, vol. 69, No. 9; Sep. 2021; 16 pages.
Office Action dated May 6, 2026, for U.S. Appl. No. 18/735,618; 33 pages.
Office Action dated Apr. 27, 2026, for U.S. Appl. No. 18/735,623; 27 pages.
Office Action dated Apr. 27, 2026, for U.S. Appl. No. 18/735,624; 29 pages.

* cited by examiner

DIGITAL PRE-DISTORTION FOR RF TRANSMITTERS USING RECONFIGURABLE MATCHING NETWORKS

CROSS-REFERENCE TO RELATED APPLICATIONS

This application claims the benefit under 35 U.S.C. § 119 of U.S. Provisional Patent Application No. 63/509,348 filed on Jun. 21, 2023, which is hereby incorporated by reference herein in its entirety.

BACKGROUND

Discrete supply modulation methods and systems improve power amplifier (PA) efficiency by switching among a discrete set of PA supply voltages depending upon the desired IQ (in-phase and quadrature) amplitude. A high PA supply voltage level is required to support high IQ amplitude (corresponding to high radio frequency, RF, output power), and at low IQ amplitude a lower PA supply voltage level can be applied to save PA power and improve efficiency. A signal processing algorithm is used in discrete supply modulation systems to determine the appropriate supply voltage level for each IQ sample in the desired transmit signal.

Transmitters are known to distort RF signals. There exist systems and methods for pre-distorting the input signal to the PA such that the output of the PA is the desired signal, thus improving the linearity of the PA. Such pre-distortion can be achieved by analog or digital means. Digital pre-distortion (DPD) systems manipulate digital baseband signal samples of the PA input waveform to create a pre-distorted baseband signal. Existing DPD methods may employ high-order nonlinearity basis functions, deep memory, neural networks, or machine learning to accurately model complicated PA distortion.

Discrete PA supply modulation creates an additional type of PA distortion caused by abrupt changes in the PA supply voltage. Existing systems and methods make use of polynomial coefficients or look-up-table coefficients indexed to the PA supply voltage level, such that the coefficients are appropriate for the supply voltage level in use.

SUMMARY

According to one aspect of the present disclosure, in a radio frequency (RF) transceiver system having a transmit chain and a digital pre-distorter (DPD), a control unit includes: one or more inputs, at least one of which is connected to receive a first signal corresponding to a signal to be transmitted via the transmit chain or a modified version of the signal to be transmitted; and an output connected to provide a control signal to the DPD, and to a reconfigurable matching network (RMN) for commanding a reconfiguration of the RMN, wherein the DPD is configured to apply digital predistortion to the signal to be transmitted based at least in part on combining the first signal with a second signal corresponding to the control signal or a translated version thereof, and to provide a resulting pre-distorted signal to the transmit chain.

In some embodiments, the control unit further includes circuitry configured to generate the control signal. In some embodiments, the RMN comprises at least one of: an output matching network (OMN); an input matching network (IMN); and an inter-stage impedance matching network (ISMN). In some embodiments, the RMN comprises a reconfigurable matching element arranged in series or parallel with another matching network element. In some embodiments, the RMN comprises at least one of the following: a microelectromechanical system (MEMS) switch; a PIN diode; a solid-state switch; and a varactor. In some embodiments, the RMN comprises an adjustable RMN. In some embodiments, the RMN is configured to be set to one of two or more discrete states. In some embodiments, the RMN is configured to change from one state to another in less than 1 microsecond.

In some embodiments, the control signal corresponds to a state of the RMN, and the RMN is configured to decoded the control signal to produce one or more control signals for one or more elements of the RMN. In some embodiments, the RMN is configured to decode the control signal using at least one of the following: combinational logic; a look-up table (LUT); and a state machine. In some embodiments, a state of the RMN is responsive at least in part to a system condition. In some embodiments, the system condition comprises at least one of: a temperature; a voltage standing wave ratio (VSWR); and a beamformer scan angle. In some embodiments, the control signal is a first control signal, wherein a state of the RMN is responsive at least to first control signal and a second control signal. In some embodiments, the second control signal corresponds at least in part to a supply voltage of one or more transistors. In some embodiments, the second control signal corresponds at least in part to a bias voltage or current of one or more transistors.

In some embodiments, a state of the RMN is responsive at least in part to one or more characteristics of the signal to be transmitted. In some embodiments, the one or more characteristics of the signal to be transmitted comprises at least one of: an average RF output power; an RF center frequency; a peak-to-average ratio; and an RF signal bandwidth. In some embodiments, a state of the RMN is responsive at least in part to one or more of an instantaneous amplitude of the signal to be transmitted signal amplitude or a pre-distorted version thereof.

In some embodiments, the DPD comprises at least one processing block arranged to process the control signal. In some embodiments, the processing block comprises a filter. In some embodiments, the filter is implemented at least in part as an finite impulse-response (FIR) filter. In some embodiments, the filter is configured to model at least a change in gain and phase of the transmit chain due to the reconfiguration the RMN. In some embodiments, the processing block implements a nonlinear transformation. In some embodiments, the processing block comprises a look-up table.

In some embodiments, the control signal comprises an index signal having a discrete sequence of values taken from a predetermined set of values, wherein the transceiver system comprises a state actuation circuit to convert the index signal to an output signal applied to produce an analog response in one or more components of the transmit chain. In some embodiments, the output is connected to the DPD via one or more preprocessing blocks configured to translate the index signal to a digitized analog signal correlated with the analog response produced in the one or more components of the transmit chain, wherein the DPD is configured to apply the digital predistortion to the signal to be transmitted based at least in part on combining the signal to be transmitted with the digital analog signal. In some embodiments, the RMN is a first state actuation circuit and the transceiver system further has a second state actuation circuit. In some embodiments, the second state actuation circuit comprises a power management circuit (PMC) for supply modulation. In some embodiments, the transceiver system further has a power amplifier (PA) and the RMN is configured to modulate load impedance of the PA. In some embodiments, the DPD is configured to apply digital pre-distortion to the first signal based at least in part on combining the first signal with the second signal and with a second control signal for the second state actuation circuit or a translated version thereof.

According to another aspect of the present disclosure, in a radio frequency (RF) transceiver system having a transmit chain, a control unit, and a reconfigurable matching network (RMN), a digital pre-distorter (DPD) includes: a plurality of inputs including at least a first input to receive a first signal corresponding to a signal desired to be transmitted via the transmit chain or a modified version of said signal, and a second input connected to the control unit to receive a second signal corresponding to a control signal for commanding a reconfiguration of the RMN or a translated version of the control signal; circuitry configured to apply digital predistortion to the signal desired to be transmitted based at least in part on combining the first and second signals; and an output connected to provide a resulting pre-distorted signal to the transmit chain.

In some embodiments, the RMN is part of an output matching network (OMN), an input matching network (IMN), or an inter-stage impedance matching network (ISMN). In some embodiments, the RMN comprises a reconfigurable matching element arranged in series or in parallel with another matching network element. In some embodiments, the RMN comprises at least one of the following: a MEMS switch; a PIN diode; a solid-state switch; and a varactor. In some embodiments, the RMN comprises an adjustable RMN. In some embodiments, the RMN is configured to be set to one of two or more discrete states. In some embodiments, the RMN is configured to change from one state to another in less than 1 microsecond.

In some embodiments, the control signal corresponds to a state of the RMN. In some embodiments, the control signal corresponds to a state of the RMN, and the RMN is configured to decode the control signal to produce one or more control signals for one or more elements of the RMN. In some embodiments, the RMN is configured to decode the control signal using at least one of the following: combinational logic; a look-up table; and a state machine. In some embodiments, a state of the RMN is responsive at least in part to a system condition. In some embodiments, the system condition comprises at least one of: a temperature; a voltage standing wave ratio (VSWR); and a beamformer scan angle. In some embodiments, the control signal is a first control signal, wherein a state of the RMN is responsive at least to first control signal and a second control signal. In some embodiments, the second control signal corresponds at least in part to a supply voltage of one or more transistors.

In some embodiments, the second control signal corresponds at least in part to a bias voltage or current of one or more transistors. In some embodiments, a state of the RMN is responsive at least in part to one or more characteristics of the signal to be transmitted. In some embodiments, at least one of the one or more characteristics of the signal to be transmitted comprises at least one of the following: an average RF output power; an RF center frequency; a peak-to-average ratio; and an RF signal bandwidth. In some embodiments, a state of the RMN is responsive at least in part to one or more of an instantaneous amplitude of the signal to be transmitted signal amplitude or a pre-distorted version thereof.

In some embodiments, the DPD comprises at least one processing block arranged to process the control signal. In some embodiments, the processing block comprises a filter. In some embodiments, the filter is implemented at least in part as an finite impulse-response (FIR) filter. In some embodiments, the filter is configured to model at least a change in gain and phase of the transmit chain due to the reconfiguration the RMN. In some embodiments, the processing block implements a nonlinear transformation. In some embodiments, the processing block comprises a look-up table. In some embodiments, the control signal comprises an index signal having a discrete sequence of values taken from a predetermined set of values, wherein the transceiver system comprises a state actuation to convert the index signal to an output signal applied to produce an analog response in one or more components of the transmit chain. In some embodiments, the output is connected to the DPD via one or more preprocessing blocks configured to translate the index signal to a digitized analog signal correlated with the analog response produced in the one or more components of the transmit chain, wherein the DPD is configured to apply the digital predistortion to the signal to be transmitted based at least in part on combining the signal to be transmitted with the digital analog signal.

According to another aspect of the present disclosure, in a radio frequency (RF) transceiver system having a transmit chain, and a reconfigurable matching network (RMN), a digital pre-distorter (DPD) includes: a plurality of inputs including at least: a first input to receive a first signal corresponding to a signal desired to be transmitted via the transmit chain or a modified version of said signal, and a second input to receive a second signal corresponding to a signal exogenous to the first signal or a translated version of the exogenous signal; circuitry configured to apply digital predistortion to the signal desired to be transmitted based at least in part on combining the first and second signals; and an output connected to provide a resulting pre-distorted signal to the transmit chain.

BRIEF DESCRIPTION OF THE DRAWINGS

The foregoing and other objects, features and advantages will be apparent from the following more particular description of the embodiments and the appended claims, as illustrated in the accompanying drawings in which like reference characters refer to the same parts throughout the detailed description. Reference characters introduced in a figure may be repeated in one or more subsequent figures without additional description in the detailed description to provide context for other features of the described embodiments.

FIG. 12B is a block diagram showing an example of a reconfigurable matching network (RMN) that can be used for load modulation, according to some embodiments.

FIG. 12C shows an example of a multiplexer for generating control signals to actuate elements of an RMN, according to some embodiments.

The drawings are not necessarily to scale, or inclusive of all elements of a system, emphasis instead generally being placed upon illustrating the concepts, structures, and techniques sought to be protected herein.

DETAILED DESCRIPTION

Herein, a signal may be said to "correspond to" a certain value or to certain information, such as temperature, voltage standing wave ratio (VSWR), battery voltage, scan angle, etc. It should be understood that this means that the signal encodes, is responsive to, or otherwise coveys that value/information.

As one with skill in the art may appreciate, the terminals of a given amplifying transistor are designated in accordance with the type of transistor being implemented. For example, a field-effect transistor (FET) has a gate terminal, a drain terminal, and a source terminal. In another example, Bipolar Junction Transistor (BJT) has a base terminal, an emitter terminal, and a collector terminal. The term "bias" is often used to describe varying voltage or current at either a gate terminal or a base terminal of an amplifying transistor.

As used herein the terms "supply" and "bias" are distinct. The term "bias" is used to refer to an input condition, for example, varying voltage or current at either a gate terminal or a base terminal of an amplifying transistor. In these two examples base current bias or gate voltage bias set the quiescent collector current or quiescent drain current, respectively. Regardless of transistor type or terminal name, the term "bias" is used to refer to an input condition impacting efficiency, linearity, or other performance aspects of the amplifying transistor. The term "supply" is used to refer to the voltage applied to (and current sourced to) the output side of an amplifying transistor. For example, in the case of a FET in common-source configuration, the supply may be applied to the drain terminal. In another example, in the case of a BJT in common-emitter configuration, the supply may be applied to the collector terminal. As used herein the "Supply Voltage" refers to the voltage applied at the output side of an amplifying transistor (i.e. drain or emitter terminals in the examples above). One with skill in the art will appreciate, while these terms may vary across transistor types the enclosed methods and techniques are contemplated to be used agnostically across all transistor types.

Figure 1:
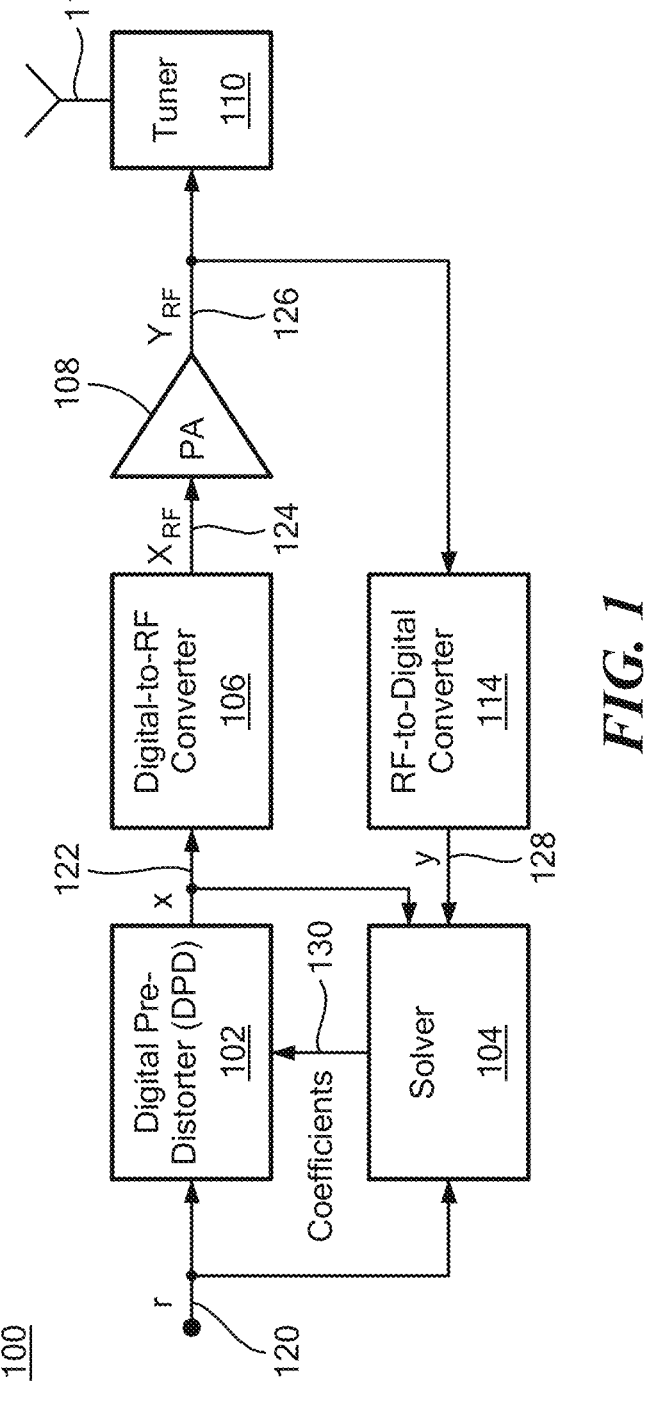
FIG. 1 is a block diagram showing an example of a radio frequency (RF) transmitter configured to digitally pre-distort an input signal representing a modulated RF signal to be transmitted, according to some embodiments of the present disclosure.

FIG. 1 shows an example of a transmitter 100 configured to digitally pre-distort an input signal representing an RF signal desired to be transmitted, according to some embodiments of the present disclosure. The input signal 120 is also referred to herein as a "signal desired to be transmitted," "desired transmit signal," or simply a "transmit signal." Illustrative transmitter 100 includes a digital pre-distorter (DPD) 102, a solver 104, a digital-to-RF converter 106, a power amplifier (PA) 108, a tuner 110, an RF antenna 112, and an RF-to-digital converter 114, which are components that may be coupled together and/or arranged as shown the figure. PA 108 can include one or more transistors (or "amplifying transistors").

Transmitter 100 may be provided as part of an RF transceiver and the general concepts, structures, and techniques sought to be protected herein can be implemented or otherwise provided within a wide range of systems and devices that transmit and/or receive data. For example, transmitter 100 may be provided in a mobile handset or other type of mobile device, a base station, customer premises equipment (CPE), an IoT sensor/device, a gaming device, an access point, network equipment, etc.

DPD 102 may be configured to receive an input signal 120, denoted r, corresponding to a digital baseband signal that represents an RF signal to be transmitted. Real-valued RF signals can be represented by baseband "IQ" notation where the in-phase and quadrature components of the signal comprise a complex number describing the amplitude and phase of the RF signal. Baseband IQ signals can be converted to equivalent RF-modulated signals by modulation of the in-phase and quadrature components (or equivalently, amplitude and phase) of an RF sine wave at the desired RF center frequency. Similarly, "amplitude/phase" notation may be used where the amplitude and phase components of the input signal 120 represent the amplitude and phase of an RF sine wave at the desired RF center frequency. Baseband signals may be represented as sampled digital signals in the transceiver. Thus, in some cases, input signal 120 may be a digital baseband signal having a notation (e.g., IQ or amplitude/phase), a precision (e.g., 14-bit), and a sample rate (e.g., 491.52 MSps), where the sample rate and precision of input signal 120 may be selected such that the input signal 120 approximates a continuous-time signal.

Input signal 120 may be received, for example, from a modem (not shown) that generates an ideal baseband signal encoding data to be transmitted. Several stages of processing in the modem and/or transceiver (e.g., upsampling, crest-factor reduction, amplification, filtering, etc.) may result in input signal 120.

For ease of explanation, signals and pathways over which they propagate are shown in the figures and described herein using common reference numerals. For example, reference numeral 120 is used both to denote an input signal to DPD 102 as well as a signal path coupled to an input of DPD 102.

DPD 102 and solver 104 may be configured to correct non-idealities throughout the signal path from the input signal 120 to the antenna 112. The DPD 102 and solver 104 can be implemented by a variety of means including as part of the transmitter modem, radio-frequency integrated circuit (RFIC), and/or as a separate circuitry, a digital signal processing (DSP) engine, firmware, and/or software.

In more detail, DPD 102 can be configured to perform real-time processing (e.g., calculations) on in-phase and quadrature (IQ) samples of the input signal 120 to produce a pre-distorted signal 122, denoted x. The pre-distorted signal 122 may be provided at an input to digital-to-RF converter 106. In response to receiving the (digital) pre-distorted signal 122, digital-to-RF converter 106 can generate or otherwise provide a corresponding RF signal 124 ($X_{RF}$) at an output thereof. It may be appreciated that practical implementations of a digital-to-RF converter may comprise components including digital re-samplers, digital and analog filters, digital-to-analog converters, amplifiers, attenuators, mixers, and IQ modulators. In some embodiments, the resulting RF signal 124 is coupled to an RF input of PA 108. PA 108 amplifies the RF signal 124 to provide an amplified RF output signal 126 ($Y_{RF}$).

The RF output signal 126 can be propagated, for example, through RF antenna 112. RF antenna 112 may be an active or passive antenna and may include one or more antenna elements forming an antenna array. It should be appreciated that practical implementation of transceiver systems may include RF filters, RF duplexers, RF switches, and other RF components. For example, RF antenna 112 may be coupled to an antenna tuner such as tuner 110, configured to match the impedance of the antenna to an RF signal (e.g., a received signal).

A portion of RF output signal 126 may be coupled (e.g., via an RF coupler) or otherwise provided to an input of an RF-to-digital converter 114. RF-to-digital converter 114 receives the RF signal provided thereto and in response generates a feedback signal 128 ($y$) which is provided to an input of solver 104.

In addition to feedback signal 128, solver 104 can also be coupled to receive input signal 120 and pre-distorted signal 122 as inputs. Of note, signals 120, 122, and 128 all correspond to baseband signal representations (e.g., sampled digital IQ signals). Solver 104 may utilize one or more techniques described below to determine one or more coefficients 130 provided as to DPD 102 for use in generating pre-distorted signal 122. Coefficients 130 are determined by the solver to effectively transform input signal 120 into pre-distorted signal 122, which will result in a transmitted RF output signal 126 conforming to a "desired" output signal, meaning an output signal that matches (and is ideally equal to) an amplified and RF-modulated version of input signal 120. Techniques employed by solver 104 may make use of a portion or all of the baseband signals provided thereto to determine and/or generate or otherwise provide coefficients 130 to DPD 102. In some cases, solver 104 may utilize other input signals other than baseband signals 120, 122, 128.

In some embodiments, solver 104 or portions thereof may be implemented as part of a device in which other components of the transmitter 100 are implemented. For example, a portion of solver 104 may be implemented on the modem firmware, in the transmitter RFIC or other circuitry of the device, in a DSP engine, and/or in software running on a processor of the transmitting device. In other embodiments, a portion or all of solver 104 may be separate from the transmit device. For example, one or more of the coefficients 130 may be determined a priori (i.e., prior to operation of the transmitter) using an external computing device or other remote processing unit.

In some cases, techniques implemented as part of the solver 104 may use one or more of the baseband signals 120, 122, 128 and a linear least squares method such as ordinary least-squares (OLS) to determine coefficients 130 in an optimal or near-optimal manner. Solver techniques can be described as "direct" and "indirect." In an "indirect" method, OLS is used to determine coefficients which model the PA's behavior (e.g., to implement a transformation of signal 124 to signal 126), and then the model is inverted to implement the DPD response. In a "direct" method, the pre-distorted signal 122 required to produce the desired RF output signal 126 is first determined, and then OLS is used to determine coefficients which model the DPD behavior (e.g., to implement a transformation from signal 120 to signal 122).

Techniques utilized by the solver 104 can be executed by any suitable processing device and/or controller on a device (not shown) in which the signal processing elements may be embodied. This processor and/or controller can be any device capable of executing one or more instructions (e.g., algorithmic instructions), and capable of receiving baseband signals 120, 122, and/or 128 via one or more signal or communication paths between the structures of the signal processing elements. The solver 104 may operate in real time (processing a stream of samples as they are provided) or offline (processing a set of samples after they have been collected). In some embodiments, one or more of the solver computation blocks and/or algorithms described herein may be provided as an RTL structure on a custom ASIC or performed by a general-purpose processor in software.

Figure 2A:
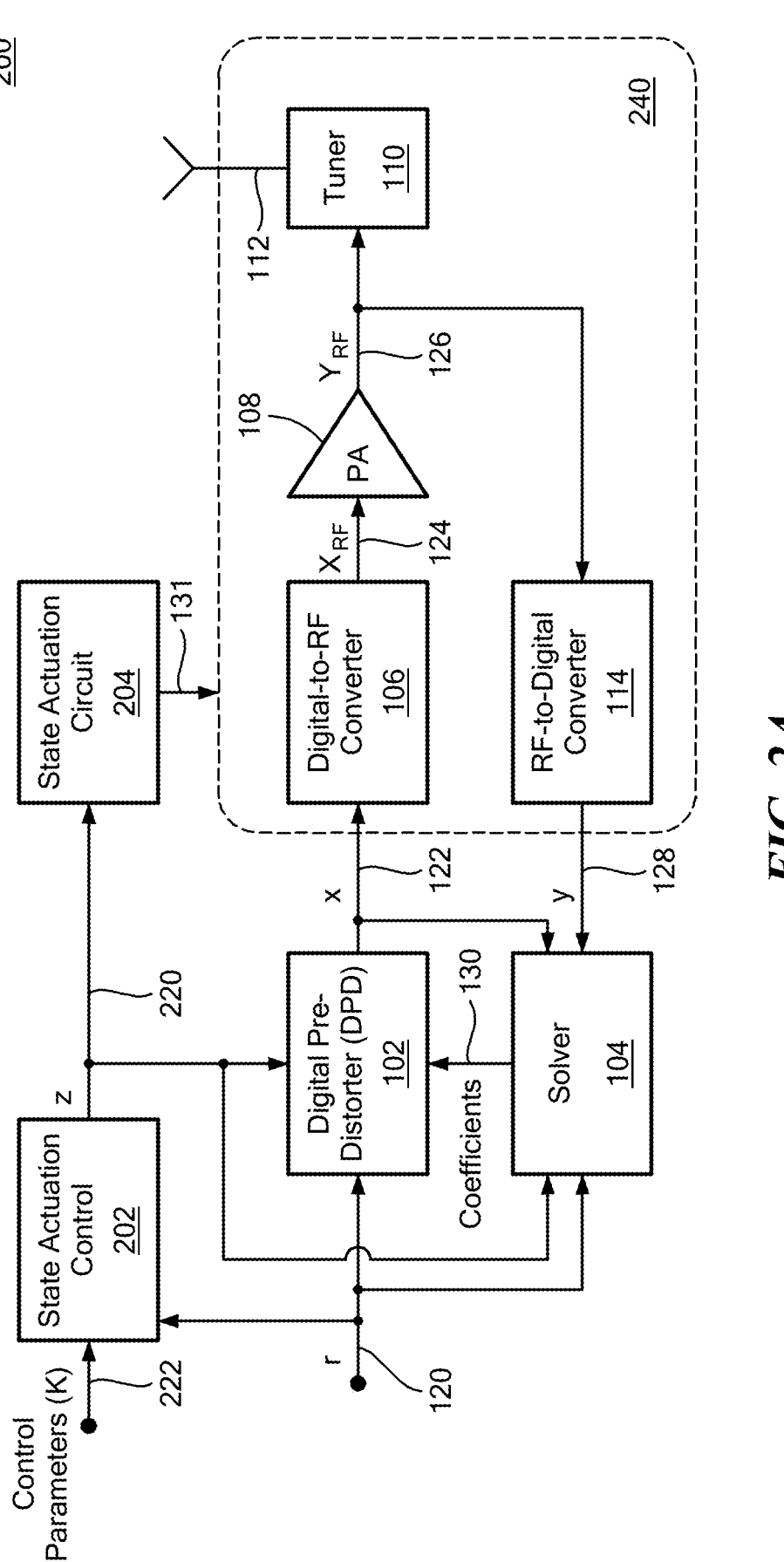
FIG. 2A is a block diagram showing an example of an RF transmitter configured to digitally pre-distort an input signal based in part on a control signal also used to actuate a system state of the transmitter, according to some embodiments.

Turning to FIG. 2A, in which like elements of FIG. 1 are show using like reference designations, an RF transmitter 200 can be configured to digitally pre-distort an input signal 120 based at least in part on a control signal 220 also used to actuate a system state. As used herein, "system state" can refer to a state of the transmitter 200 itself, a state of a transceiver of which transmitter 200 is a part, a state of a portion of a transceiver, and/or a state of the device/system in which said transmitter/transceiver is provided. Illustrative transmitter 200 includes a DPD 102, a state actuation control unit 202, a state actuation circuit 204, a solver 104, and PA 108. The PA provides an RF output signal 126 ($Y_{RF}$) which can be propagated, for example, through an RF antenna 112.

Control unit 202 may be configured to command change in a system state. For example, control unit 202 may be a digital control to actuate one or more of: a PA supply voltage, a PA bias voltage or current, a reconfigurable load or other matching network, and/or other transmitter component behavior (e.g., IQ modulator gain/offset/quadrature, amplifier gain, or filter bandwidth).

Control unit 202 is configured to receive input signal 120 and/or a modified version of the input signal 120. For example, in the case of discrete supply modulation (sometimes referred to as "digital supply modulation") as well as in other cases, the modified version of input signal 120 may correspond to an amplitude—also called envelope or magnitude—of the input signal 120 (which may be a complex baseband signal as previously discussed). Control unit 202 is configured to generate a control signal 220 (denoted z) for state actuation circuit 204 and may also provide controls signal 220 to DPD 102 and/or solver 104. DPD 102 may be configured to utilize control signal 220 at least in part to generate pre-distorted signal 122.

Control unit 202 may be configured to receive one or more control parameters 222, which are denoted herein as $K=\{k_1, k_2, \ldots, k_m\}$, where m is an integer greater than or equal to one. Control parameters 222 may be received, for example, from a modem and/or transceiver based on a performance tradeoff desired. Control parameters 222 may be determined based on an operating condition and/or system state of the transceiver system. For example, the control parameters 222 may be determined and communicated to the Control unit 202 based on a system state relating to the transceiver. In another example, the control parameters 222 may be determined and communicated to the Control unit 202 based on the operating condition as commanded by a modem.

State actuation circuit 204 may include any circuit of transmitter 200 configured to be adjusted by control unit 202 to effect some change in system state to achieve some performance benefit or tradeoff (e.g., linearity vs. efficiency). For example, state actuation circuit 204 may be a circuit configured to respond to a control signal 220 from the control unit 202 to actuate one or more of: tuning network impedance or aperture, beamformer scan angle, amplifier bias voltage and/or current, amplifier supply voltage, or circuit behavior (e.g., IQ modulator quadrature/offset/gain, variable gain amplifier gain or attenuator attenuation, phase shifter angle), reconfigurable matching network, and any other type of circuit that can actuate a system state. Adjustment of these circuits responsive, in part, to input signal 120 can lead to improvement in transceiver linearity, efficiency, and/or other performance metrics. As one with skill in the art may appreciate, state actuation circuit 204 may be connected to any of the one or more components the circuit is intended to effect a change in state thereof. For example, as shown in FIG. 2A, state actuation circuit 204 may effect a change in state of any of the components shown in box 240, including digital-to-RF converter 106, PA 108, tuner 110, and RF-to-digital converter 114. State actuation circuit 204 may be implemented separately from, or together with, components shown within box 240.

Digital-to-RF converter 106, PA 108, tuner 110, and antenna 112 may be collectively referred to as the "transmit chain." In practice, a transmit chain may include additional components.

Figure 2B:
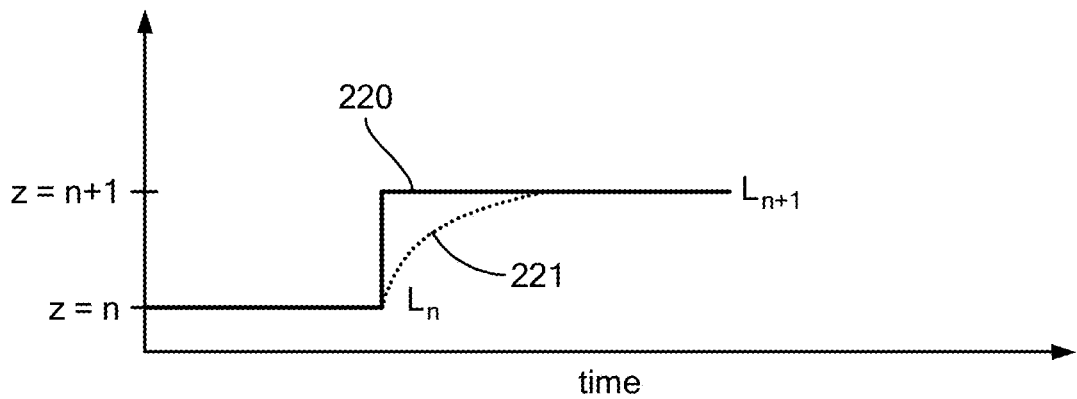
FIG. 2B is a timing diagram of a control signal and a transceiver component response corresponding to a transition from a first system state to a second system state.

Compared to the prior art, the digital predistortion techniques disclosed herein for DPD 102 may provide enhanced predistortion to an input signal 120 by digitally modeling an analog response of a transceiver component due to operation of a state actuation circuit 204 when modulated by a control signal 220. For example, FIG. 2B shows a control signal 220 stepping from a value n to a value n+1, causing the state actuation circuit 204 to transition between a state L and L+1. However, state actuation circuits may transition with some non-instantaneous response as shown in the dashed line 221.

The control signal 220 therefore varies from the behavior enacted by the state actuation circuit 204 and may not be directly useful for predistortion. For example, in the case of discrete supply modulation: a power management circuit (PMC) 304 (shown in FIG. 3 corresponding to the state actuation circuit 204 of FIG. 2A) responding to an output voltage level control signal 322 (s, shown in FIG. 3 and also referred to as a "level select signal") will need to charge some amount of output capacitance through some parasitic inductance and with finite input current. As a result, the actual response 221 will take a non-zero period of time and have a shape different than the control signal 220, as shown by the dashed line in FIG. 2B. Of note, FIG. 2B is intended to illustrate a relationship between the control signal z and the ideal response and, to this end, certain voltages are not necessarily drawn to scale.

Providing a signal correlated with analog behavior (i.e., modeling the behavior) also leads to a lower-complexity solution than prior art predistortion techniques. For example, prior art techniques may compensate for the above-described variation by including predistortion, applying average corrections to the transition, applying a predetermined multiplicative or additive correction to samples following each transition (e.g., pulse cancellation), or high-complexity Volterra-based solutions with deep memory which become impractical to implement.

Coefficients for signal processing elements used to model hardware may be adjusted according to the state of the system. For example, if the analog behavior of the state actuation circuit is modified by adjustment of the state actuation circuit, the coefficients may be similarly modified to correspond to that behavior.

Figure 3:
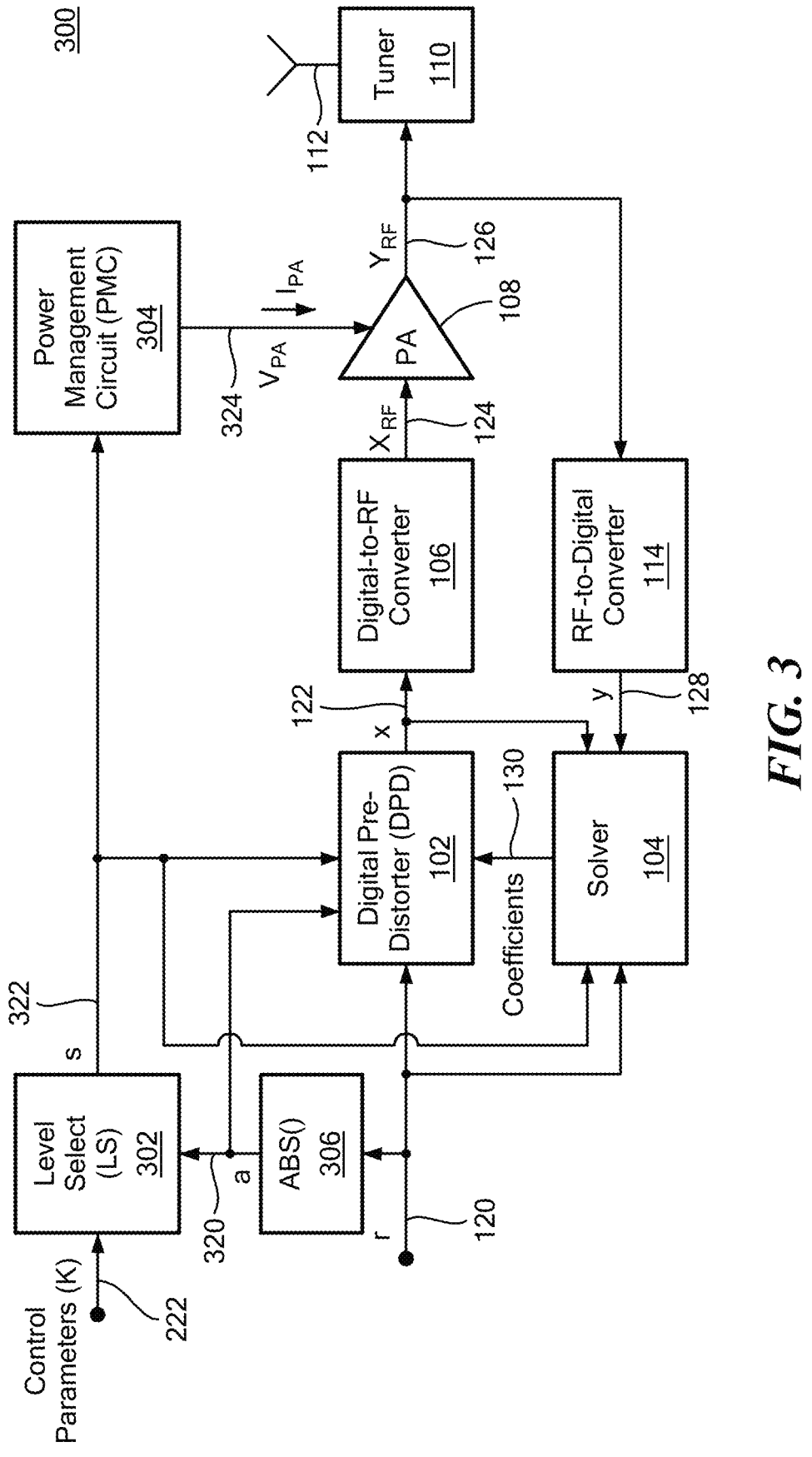
FIG. 3 is a block diagram showing an example of an RF transmitter configured to digitally pre-distort an input signal based in part on a level select signal used to vary a supply voltage level of a power amplifier (PA), according to some embodiments.

Referring now to FIG. 3 in which like elements of FIGS. 1 and 2 are shown using like reference designations, illustrated is another example of an RF transmitter with digital pre-distortion, according to some embodiments. Illustrative transmitter 300, which may be referred to as a supply modulated transmitter, implements discrete supply modulation using a level select 302 and a PMC 304. Relating FIGS. 2 and 3, level select 302 is an example of a state actuation control unit 202 and PMC 304 is an example of a state actuation circuit 204.

Transmitter 300 further includes an absolute value block 306 configured to transform input signal 120 into a signal 320, denoted a, which corresponds to the amplitude component (also called the magnitude) of input signal 120. In some cases, absolute value block 306 may be implemented using, or correspond to, a CORDIC ("coordinate rotation digital computer") or a half-CORDIC. Other means of obtaining the amplitude component of the input signal maybe used.

Level select 302 receives amplitude signal 320 as an input and utilizes or otherwise processes it to generate a level select signal 322, denoted s. In other embodiments, level select 302 may directly receive and process input signal 120 (i.e., absolute value block 306 may be omitted in some cases). Level select signal 322 may be provided to PMC 304, to DPD 102, and to solver 104. Level select signal 322 conveys to PMC 304 information which allows PMC 304 to provide a supply voltage 324 ($V_{PA}$) to PA 108 (or, more generally, to one or more PAs). The supply voltage 324 may be selected/determined to have a voltage level that is (a) sufficiently high to cause PA 108 to amplify RF signals for transmission and (b) sufficiently low to cause PA 108 to operate substantially close to its gain compression region where PA efficiency may be maximized.

In some embodiments, to indicate an appropriate PMC 304 output voltage, level select signal 322 may represent an index (or "level value") indicating a desired supply voltage level. For example, the index may be an integer value in the range [1, n] where n corresponds to a highest voltage level that can be supplied by PMC 304. Level select 302 may implement an algorithm and/or a look up table (LUT) that determines a level value for each sample of amplitude signal 320.

A level selection algorithm implemented by level select 302 is a so-called "controller" for the PA 108 supply voltage level. Controllers for PA supply voltage level and other digital system inputs are considered in this disclosure.

To control operation of the PMC 304, level select signal 322 may be provided as a control signal to the PMC 304, along with other possible control signals. In some embodiments, these control signals may be conveyed using a digitally controlled level (DCL) interface in which a sequence of bits in the digital signal command an associated PMC 304 voltage output level and possibly other system states. An encoding or mapping scheme may be used to efficiently convey voltage level and/or other control information from level select 302 to PMC 304 (e.g., using the DCL interface).

Level select 302 may be configured to receive and utilize one or more control parameters 222 (K) from a modem and/or transceiver. In some transmission scenarios (e.g., RF frequency band, RF output power, desired signal bandwidth, desired signal peak-to-average ratio, etc.), Level select 302 may be configured by the modem and/or transceiver using control parameters 222 to produce control signal 322 closely following the shape (or "envelope") of an amplitude signal derived from input signal 120 to increase PA 108 efficiency (e.g., at the expense of linearity). An example of such an amplitude signal is shown and described below in the context of FIG. 3. In some cases, one or more control parameters 222 may cause control unit 202 to produce control signal 322 commanding a constant supply voltage level higher than the minimum required in order to increase PA linearity (e.g., at the expense of efficiency). In general, control parameters 222 give the transmitter 300 flexibility to trade efficiency for linearity and spectral emission as needed to satisfy requirements of operation in different scenarios. Control parameters 222 may be determined during operation of transmitter 200 based on transmission scenarios and/or pre-determined (prior to operation of transmitter) based on characterization of the modem and/or transceiver. Control parameters 222 may be determined in real time during operation of transmitter 300 based on operating conditions and/or pre-determined from earlier characterization of the transceiver.

DPD 102 may modify input signal 120 to compensate for amplitude (AM-AM) distortion and phase (AM-PM) distortion. Amplitude distortion refers to the static (non-time-varying) change in the PA 108 gain versus input power characteristic. Phase distortion refers to the static changes in PA 108 insertion phase versus input power characteristic. In the case of static distortion, the distortion characteristic depends only on the current value of the input signal 120.

In addition to static distortion compensation described above, techniques used by the DPD 102 can also correct for dynamic changes in the PA's 108 amplitude (AM-AM) distortion and phase (AM-PM) distortion characteristics. Dynamic distortion varies depending on other system states and conditions (e.g., temperature, supply voltage, RF frequency of operation), and may be referred to as memory effects and can include baseband memory effects (or long-time-constant memory) and RF memory effects (or short-time-constant memory). Dynamic distortion characteristics depend on system conditions or inputs other than the instantaneous value of baseband input signal. Some disturbances or conditions causing memory may be partially or completely correlated with the input signal 120, such as temperature due to self-heating, or the previous values of the input and output signals, or supply voltage in the case of supply modulation transmitters. Other conditions causing dynamic distortion (e.g., memory) may be unrelated to and uncorrelated with the input signal, such as antenna mismatch, RF frequency of operation, ambient temperature, etc. Such system conditions and disturbances are referred to herein as "exogenous." In some embodiments, DPD 102 can receive one or more inputs or signals responsive to exogenous conditions. Such inputs are referred to herein as "exogenous inputs" or "exogenous signals."

Baseband memory effects can arise from slowly varying phenomena with time constants similar to the baseband input signal bandwidth, for example memory based on the absolute value of the baseband signal. These may include changes in PA 108 nonlinearity due to PA 108 transistor temperature variation or bias line voltage variation. For example, the gain and phase of the PA 108 may change in response to one or more of temperature and/or voltage changes. Intentional supply voltage modulation is a primary source of baseband memory effects for discrete supply modulation transmitters.

Dynamic changes in the transceiver digital controls (such as level select 302 commanding a change in PA supply voltage 324 provided from PMC 304) may cause a change in the static nonlinearity of the transceiver, because the PA is caused to operate at a different supply voltage. DPD systems for systems with digital controls must compensate for changes in the distortion characteristic at each state of such digital controls.

While the command from a control unit changes the control signal immediately, the state actuation circuit effects an analog change in transceiver circuitry over some non-zero period of time. For example, in a discrete supply modulation system such as that shown in FIG. 3, level select 302 commands a change in output voltage level to take effect immediately, but the PMC 304 may effect a change in voltage at the PA supply terminal over some non-zero period of time. The PA distortion characteristic is dependent on the actual voltage at the PA 108 supply terminal, and thus changes over that non-zero period of time. Therefore, effective pre-distortion of the supply voltage change (or other system state) commanded by a control unit may require translation of the digital control signal (e.g., level select signal 322) into a digital representation of an analog response at the transmitter component (e.g., PA supply voltage 324). According to embodiments of the present disclosure, such translation is provided by one or more processing blocks, as described below.

The term "processing block" herein refers to either a preprocessing block (e.g., a block configured to provide a preprocessed version of a signal to a nonlinear combiner) or a postprocessing block (e.g., a block configured to receive an output of the nonlinear combiner or a translated version thereof).

In addition to the static nonlinearity and memory effect distortion described, DPD 102 may be configured to address non-idealities from other sources. For example, digital-to-RF converter 106 may impose the in-phase and quadrature components of pre-distorted signal 122 onto an RF carrier signal with imperfect quadrature relationship (not precisely 90 degrees out of phase), and/or may allow a small average value (DC) offset or scaling error in said in-phase and quadrature components. In another example, the baseband and/or RF signal paths may have some imperfect frequency response, causing non-idealities in output signal 126. These types of errors typically introduced by the transceiver and RF front-end can be compensated using one or more digital predistortion techniques described herein.

According to some embodiments, a single set of coefficients 130 may be used/applied to describe DPD 102 behavior for all supply voltage levels used in transmission by PMC 304 and, more generally, to compensate for changes in PA linearity due to actuation of other digital system states, as well as changes in transmitter conditions like temperature or mismatch, as described further below. In addition to receive coefficients 130 as input, DPD 102 can receive amplitude signal 320 and level select signal 322. These various inputs can be utilized by DPD 102 to generate pre-distorted signal 122, using structures and techniques described below.

Figure 4A:
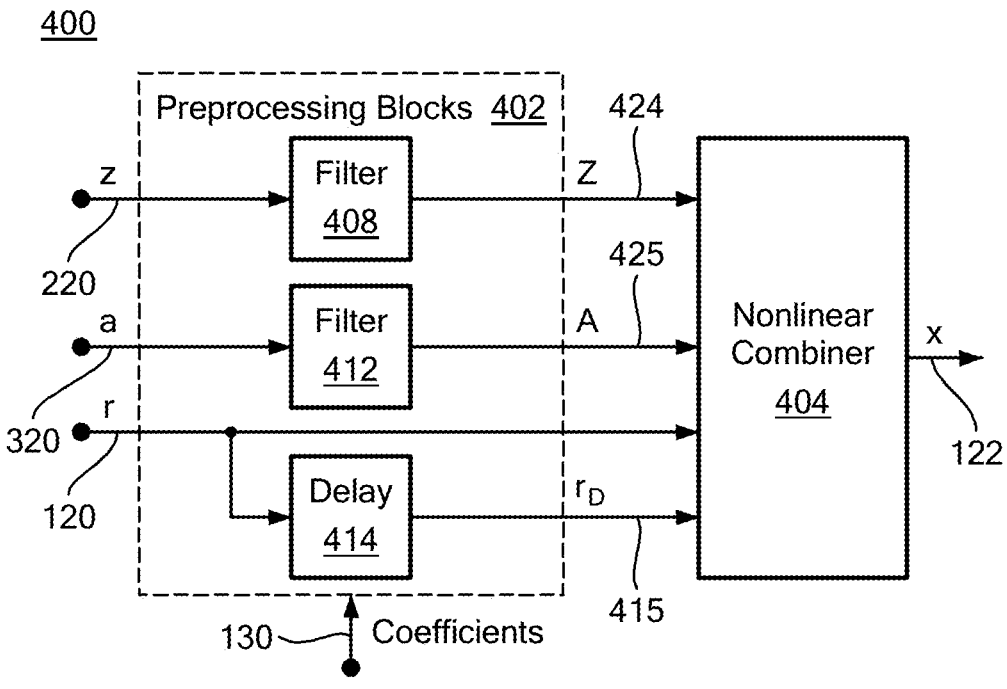
FIGS. 4A-D are block diagrams showing examples of a digital pre-distorter (DPD) that may be provided within an RF transceiver, according to some embodiments.

Turning to FIG. 4A, in which like elements of FIGS. 1-3 are shown using like reference designations, illustrated is a DPD 400 configured to digitally pre-distort an RF signal to be transmitted. DPD 400 may be the same as or similar to DPD 102 of FIGS. 1-3, for example. DPD 400 can convert input signal 120 (e.g., a digital baseband signal in IQ notation) into pre-distorted signal 122. DPD 400 can also receive, as input, amplitude signal 320 corresponding to the amplitude component of input signal 120, a control signal 220 (z), and one or more coefficients 130 provided by a solver (e.g., solver 104 of FIG. 3). Control signal 220 may correspond to, for example, level select signal 322 of FIG. 3 or any other signal used to control or actuate a system state within a transceiver such as control signal 220 (z) of FIG. 2A. In some cases, control signal 220 may correspond to a translated version of a control signal. For example, a pre-processing block external to DPD 400 may be used to translate a control signal (e.g., signal 220 of FIG. 2) prior to input to the DPD (e.g., by converting it from a discrete voltage level into a transient analog signal). Signals 120, 320, and 220 are collectively referred to herein as the DPD input signals. In other embodiments, a DPD may receive different types and numbers of input signals.

DPD 400 can include one or more preprocessing blocks 402 and a nonlinear combiner 404. Preprocessing blocks 402 can include various numbers and types of preprocessing blocks arranged in various topologies depending on their intended application. In general, preprocessing blocks 402 can include at least one block to receive a corresponding one of the DPD input signals. The outputs of preprocessing blocks 402 (or combinations of said outputs) may be provided to nonlinear combiner 404, which in turn combines those outputs in various ways to generate the pre-distorted signal 122. Specific examples of preprocessing blocks and nonlinear combiners are disclosed herein. More generally, a group of preprocessing blocks 402 can collectively receive one or more input signals and operate on those signals to provide one or more preprocessed signals.

In the example of FIG. 4A, processing blocks 402 are shown including: a first filter 408, a second filter 412, and a Delay 414. In general, a DPD preprocessing block can include any type of digital element, component, or block configured to operate on a signal, including but not limited to a LUT, algorithm, polynomial, filter, nonlinear transformation, mathematical operator (e.g., sum, multiplication, inverse), multiplexer (and/or other combinatorial logic), resampler, interpolator, decimator, a comparator, and/or a delay. The preprocessing blocks 402 shown here as each having a single input and a single output may, in other embodiments, have one or more inputs and/or outputs. The preprocessing blocks may receive, as input, an output from another preprocessing block. As one with skill in the art may appreciate, two or more preprocessing blocks may be arranged and/or combined in series and/or parallel configurations as may be required to preprocess the input, a translated version of the input, and/or other signals for further processing by the nonlinear combiner 404. For example, in the parallel configuration the outputs of two separate preprocessing blocks with the same or separate inputs may be combined (e.g., by summation or multiplication). In another example of a parallel configuration two separate preprocessing blocks may operate on a common input signal and produce two separate output signals.

In this embodiment, the input signal 120 is applied directly to nonlinear combiner 404 and a delay 414 is added to the input signal 120 to product a delayed input signal 415 ($r_D$) corresponding to a delayed version of input signal 120. In some embodiments, delay 414 may be zero or effectively zero. One with skill in the art may recognize that a Volterra-derived model (e.g., memory polynomial) may be constructed using the described nonlinear combiner having input 120 and one or more delayed versions of the input 120 (e.g., delayed input signal 415). Such a model is used in the art to model memory transmitter effects. Additional nonlinear combiner inputs (each having different preprocessing delay) are used to extend the memory depth, but also has downsides including additional implementation complexity, additional coefficient count, and additional multipliers (corresponding to additional requirements of physical size and power consumption). In the present approach both delay and other preprocessing blocks described (e.g., filters, and specifically FIR-implemented filters) may be applied to any input (e.g., signal 220 (z) which may correspond to level select signal 322 (s) in supply modulation, signal a 320, input signal 120 (r) of FIG. 4A, and any additional input such as additional control signals and exogenous signals) and used to extend memory depth at lower complexity, coefficient count, and multipliers.

A delay preprocessing element has the effect of delaying a first signal with respect to others. The delay may be configured to delay the first signal by an integer number of samples or by a fractional number of samples. Any known techniques known in the art may be used to implement fractional sample delay (e.g., filtering with an FIR filter having all-pass amplitude response and linear phase response). It is appreciated that a first signal may be delayed with respect to all other signals, or that the delay block may be applied to all other signals to effect an advance in timing of the first signal. As an example, referring to FIG. 4A, delay element 414 can produce a delayed input signal 415 ($r_D$) corresponding to a delayed version of input signal 120 (r); first filter 412 can produce a first filter signal 424 (A) corresponding to a filtered version of amplitude signal 320; and second filter 408 can produce a second filtered signal 424 (Z) corresponding to a filtered version of control signal 220. It is appreciated that delayed input signal 415 effectively advances timing of input signal 120. Delay or advance in timing of one signal with respect to the others proves useful in modeling memory behavior (e.g., memory effects) by adding a dependence of the current output on a previous input. Delay elements in the preprocessing blocks 402 may be implemented as programmatically configurable delays programmed, for example, as a pre-distortion coefficient, fixed to a static value, adjusted based on the group delay of a filter response resulting from selected coefficients of an FIR or similar filter, or adjusted based on the digital sampling rate of the preprocessing blocks. In the illustrated example the delayed input signal 415 ($r_D$) is shown delayed with respect to input signal 120 ($r$), but as one with skill in the art may appreciate the delay can be applied to any signal relative to the input signal 120. For example, the delay could be applied to control signal z with respect to the input signal 120.

A resampling element changes the time period between samples of a digital signal while minimizing, to the extent possible, loss or corruption of signal information. Upsamplers and downsamplers are resampling elements used, respectively, to increase or decrease the frequency of samples. The former may be realized for example by interpolation to increase the number of samples representing the signal over a given period of time, and the latter may be realized by decimation followed by filtering to reduce the number of samples representing the signal over a given period of time. Efficient digital signal processing techniques for resampling are well known in the art (e.g., interpolation or decimation followed by filtering).

One skilled in the art may appreciate that preprocessing signals at a reduced rate or at a fixed rate (e.g., a fixed rate independent of the transmit signal sample rate) may be useful for a variety of preprocessing blocks. For example, a signal known to have limited signal bandwidth content may be downsampled, processed at a lower sample rate, and then upsampled to the original rate for use with other signals. Some possible benefits of processing at a lower rate include reduced digital logic power consumption, reduced size required to realize the preprocessing algorithm in digital logic, reduced latency through the preprocessing block. In another example consider a system in which the input signal r may be provided at different sample rates. Some preprocessing blocks will produce a different response depending on the sample rate, e.g., a single set of FIR filter coefficients will produce a different frequency response depending on the signal sample rate. A fixed frequency response may be achieved using one set of FIR filter coefficients if an appropriate resampler is used before the FIR filter to convert the input signal to a fixed rate, and a second resampler is used at the output of the FIR filter to achieve the original sample rate. In such a configuration the FIR filter will always operate on data of a set sample rate, and the FIR filter will always produce the same frequency response.

While the embodiment of FIG. 4A shows a single delay 414 operating on the input signal 120 ($r$), it should be appreciated that the general concepts and structures sought to be protected herein are not limited to this arrangement. For example, in other embodiments, delays may additionally or alternatively be provided to operate on control signal 220 ($z$) and/or amplitude signal 320.

Filters 408 and 412 may be configured to achieve any desired frequency response, such as a low-pass, high-pass filters, all-pass filters, etc. Further, such filters may be implemented by a variety of methods such as a finite impulse-response (FIR) filter, an infinite impulse-response (IIR) filter, a filter that is at least in part an FIR filter (e.g., a combination of FIR and IIR structures or "hybrid" structure/filter), etc. The IIR structure has an advantage of reproducing very long step response with few coefficients and precisely modeling analog filters. However, the IIR may be practically challenging due to digital implementation timing requirements on the feedback path, sensitivity to quantization noise requiring complex fixed-point implementation, and reduced numerical stability. By contrast the FIR structure can synthesize an arbitrary frequency response and is unconditionally stable. Fixed-point implementation is also more straightforward because FIR structure lacks any feedback path and has reduced sensitivity to quantization noise. A hybrid structure comprised of a low-order FIR and low-order IIR in cascade may be a desirable compromise to synthesize more diverse range of frequency responses, increased step response length, and moderate design complexity.

While the illustrated embodiment of FIG. 4A shows three (3) preprocessing blocks, the general concepts, structures, and techniques sought to be protected herein are not limited to any numbers or arrangements of preprocessing blocks. In some embodiments, additional processing blocks may be included. For example, preprocessing blocks can be arranged in parallel or cascade arrangements depending on their intended application. Further, in some embodiments one or more of these preprocessing blocks and/or preprocessing block examples may be combined, provided together with, and/or provided separate from one or more of the nonlinear combiner 404 and the DPD 400.

Preprocessing blocks 402 can take the form of any input-to-output transformation, including linear or nonlinear functions, time variant or time invariant functions, look-up tables, state machines, delays, filters, or other algorithms. Preprocessing blocks 402 can incorporate inputs from real-valued or complex-valued signals including digital control signals (e.g., discrete supply modulation control signal commanding a discrete voltage level from a PMC), digital representations of analog control signals (e.g., continuously variable gate bias control signal), or baseband signals, etc. In some cases, preprocessing blocks 402 may use a feedback signal (e.g., feedback signal 128 of FIG. 2A or pre-distorted signal 122) as input. The output of a preprocessing block may take the form of a real-valued or complex-valued signal, and may represent digital control signals, digital representations of analog control signals, or baseband signals.

As discussed previously Volterra-derived models can represent memory and also nonlinearity, but at cost of increasing complexity, coefficients, and multipliers. Consider the scenario where the value of an input control signal 220 ($z$) is related to its effect on PA nonlinearity by a sigmoid function. High-order nonlinear Volterra terms would be required to incorporate the control signal 220 ($z$) into the pre-distorted signal 122 ($x$), adding complexity, coefficients, and multipliers to the solution. A preprocessing block 402 may be used to translate the control signal 220 ($z$) into a nonlinear combiner input Z 424 more linearly related to the effect on PA behavior, thus reducing the required nonlinear order of the nonlinear combiner 404 as compared to an equivalent-performance Volterra-derived model. Such preprocessing blocks may be realized with mathematical functions (e.g., polynomial, sigmoid, etc.), or as a LUT approximating the nonlinear transformation.

The overall response of the cascade of a preprocessing block (or blocks) with a nonlinear combiner may be combined into a single block or expression. As an example, consider the following cascade of an FIR filter and a nonlinearity:

$$\text{FIR filter: } y(n) = a0 * x(n) + a1 * x(n-1) + a2 * x(n-2) \qquad \text{EQ.1}$$

$$\text{Nonlinearity: } z(n) = b0 + b1 * y(n) + b2 * y^\wedge 2(n) \qquad \text{EQ.2}$$

-continued

Cascade of $FIR$ + Nonlinearity: $z(n) =$  EQ.3

$$b0 + b1 * (a0 * x(n) + a1 * x(n-1) + a2 * x(n-2)) +$$

$$b2 * (a0 * x(n) + a1 * x(n-1) + a2 * x(n-2))^{\wedge}2$$

In this discussion, preprocessing blocks, nonlinear combiner, and post-processing blocks provide a framework for describing and understanding particular signal processing techniques for digital predistortion. This framework is used by way of description and not limitation. For example, a preprocessing block (e.g., EQ.1) in cascade with a nonlinearity (e.g., EQ.2) may be equivalently expressed as a single expression (e.g., EQ.3). One skilled in the art may appreciate that the same underlying signal processing can be refactored into different forms for clear explanation or improved implementation. In this case, the framework (e.g., connection of preprocessing blocks, nonlinear combiners, and post-processing blocks) is used for clarity, but one skilled in the art may appreciate that signal processing mathematics and techniques for predistortion discussed herein may also be also described in any mathematically equivalent alternate form.

Control signal 220 (z) enters the DPD 102 and is input to one or more preprocessing blocks 402. It may be appreciated that the function of such preprocessing blocks (e.g., scaling, filtering, etc.) may be performed in a different functional block before entering the DPD. Preprocessing blocks 402 and nonlinear combiner 404 are grouped together inside the DPD 400 in this discussion by way of clear description and not limitation. One skilled in the art may appreciate that a preprocessing block may be implemented separate from the DPD 400 or described as a block separate from the DPD 400. For example, an alternate block diagram may describe Filter 408 as implemented within the level select 302 such that signal Z 424 enters the DPD directly from the control unit 202. Such a case illustrates that the same underlying signal processing may be repartitioned for clear explanation or improved implementation but still makes use of the concepts described herein.

As mentioned previously, coefficients 130 can be derived by a solver. Different ones of the coefficients 130 may be provided to and utilized by different ones of the preprocessing blocks 402 and/or by nonlinear combiner 404 (to promote clarity in the drawings, coefficients 130 are simply shown as an input to DPD 400 itself). For example, first filter 408 may utilize one or more of the coefficients 130, second filter 412 may utilize other ones of the coefficients 130, etc. In the case of a filter, the number of coefficients may be determined based on a length of the filter. The number of coefficients provided to nonlinear combiner 404 may be determined based on the degree of a polynomial basis function implemented by the combiner (e.g., a second order polynomial basis function, a third order polynomial basis function, etc.). Each of the coefficients 130—including those provided to preprocessing blocks 402 and those provided to nonlinear combiner 404—may be individually addressable and modifiable to effect correct pre-distortion of the input signal 120.

Figures 5, 6:
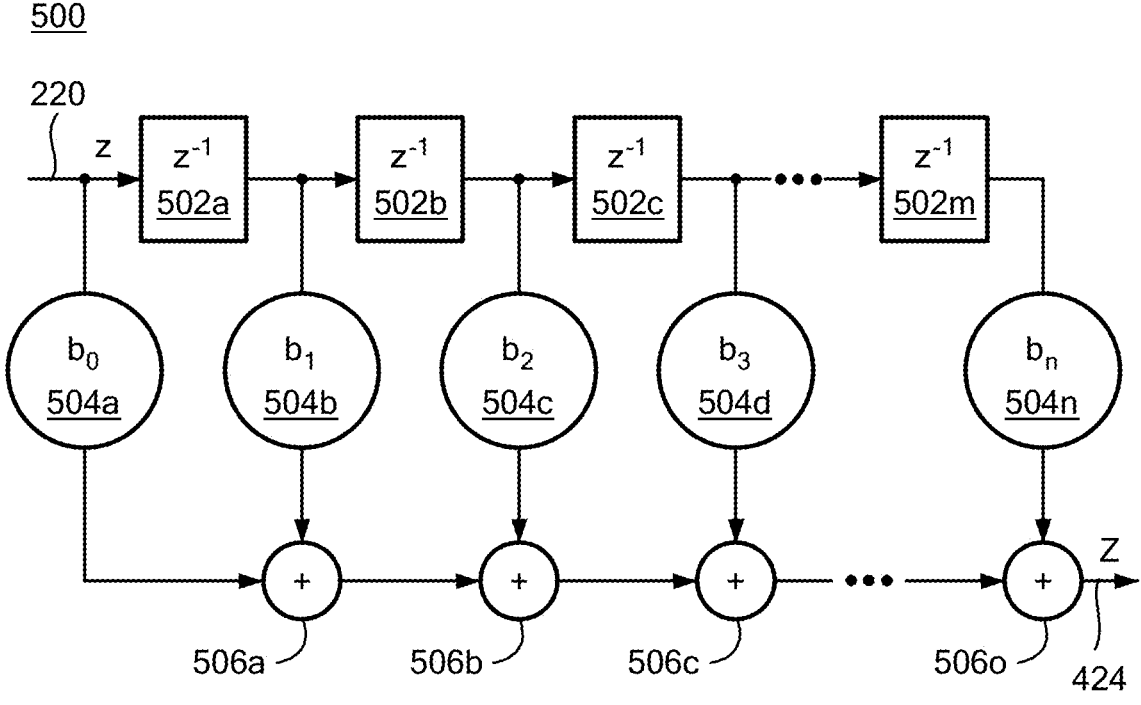
FIG. 5 shows an example of a processing block that may be provided within a DPD, according to some embodiments.
FIGS. 6-8 show examples of nonlinear combiners that may be provided within a DPD, according to some embodiments.

Coefficients of a filter preprocessing block may include the weights applied to each tap of a finite impulse response filter (e.g., taps 504 in FIG. 5). Coefficients of an NLT block may include the coefficients of a polynomial or other nonlinear equation. Coefficients of a delay preprocessing block may include the time (e.g., number of clock cycles) for which the signal should be delayed. Coefficients of LUT may include values defining input-output mapping of the block. In all cases, the relevant coefficients 130 for preprocessing blocks 525 and nonlinear combiner 404 may be derived by the solver and loaded into the DPD 400. In some cases, one more coefficients may be pre-determined by the solver and stored and loaded into DPD 400 during operation.

Pre-distortion networks described herein may benefit from applying a variety of specialized solver techniques sequentially (such as those discussed in conjunction with FIG. 1) to determine required coefficients sequentially for each group of blocks. Some or all steps may be used for different types of calibration including "characterization" which may calculate a generic set of coefficients for all transceivers having the same hardware using a single transceiver in the lab, "factory" calibration which may calculate a customized set or sub-set of coefficients for each unique transceiver during production, and "real-time" adaptation in which may update a set or sub-set of coefficients during transceiver operation. Real-time adaptation may occur continuously, on a pre-set time interval, when operating conditions (e.g., temperature, voltage standing wave ratio) change beyond a given threshold, when the transmit conditions are adjusted (e.g., band/channel of operation, desired signal characteristics like bandwidth or peak-to-average ratio), or at device turn-on. In some cases, the solver may generate one or more coefficients responsive to a configuration of a PMC of the RF transceiver system. In one example, coefficients may be adjusted when the PMC supply levels are assigned different voltages by changing configuration of the multi-output supply generator voltage targets. In another example, coefficients may be adjusted when the output impedance of the PMC is adjusted by changing configuration of the pulse shaping network switches, or by changing configuration of the multi-output supply generator control loop bandwidth or switching frequency.

Nonlinear combiner 404 can receive, as input, input signal 120 (r) along with one or more preprocessed signals generated by preprocessing blocks 402. Nonlinear combiner 404 can combine these various inputs to form pre-distorted signal 122 (x) using various structures and techniques described below.

Figure 4B:
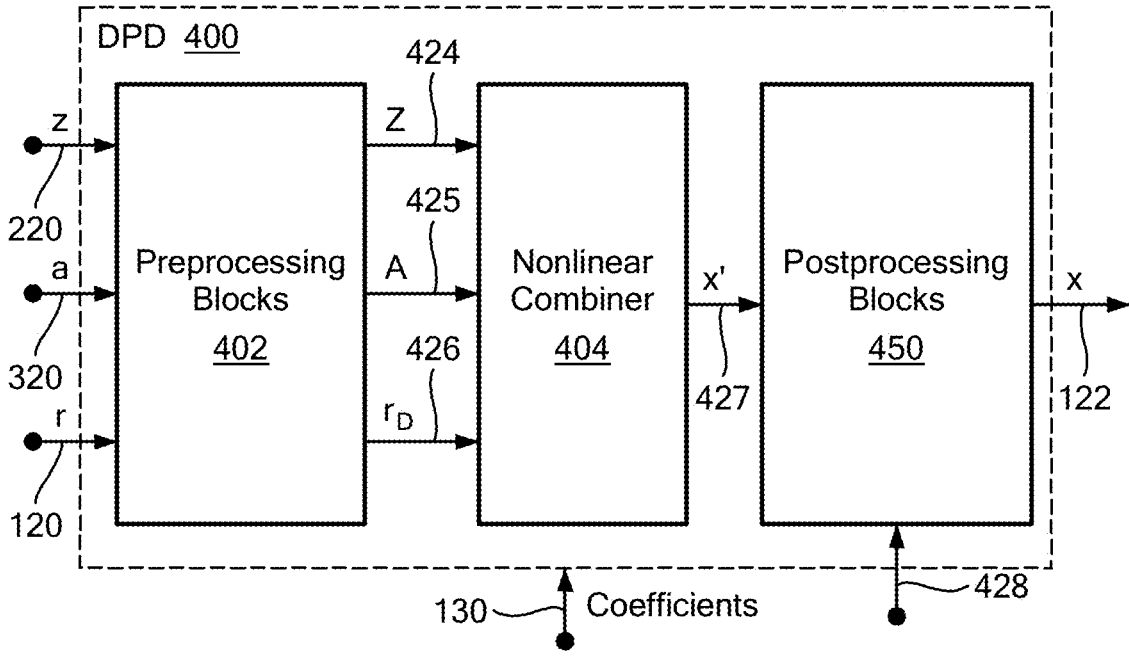

FIG. 4B, in which like elements of FIGS. 1-4A are shown using like reference designations, illustrated is a DPD 400 configured to digitally pre-distort an RF signal to be transmitted. DPD 400 may be the same as or similar to DPD 102 and 400 of FIGS. 1-4A, for example. In some embodiments, DPD 400 may include one or more postprocessing blocks 450 coupled to the output of the nonlinear combiner 404. The postprocessing blocks 450 may have the same form as any preprocessing block mentioned herein. Postprocessing blocks 450 may take any input signal the preprocessing blocks can take. The postprocessing blocks 450 may be configured to receive one or more of: input signal 120 or derivatives thereof (e.g., amplitude signal a 320 and delayed signal $r_D$ 426), exogenous signals 428 (e.g., signals such as temperature described in more detail below), control signal 220 (e.g., level select signal 322), output of other postprocessing blocks 450 and/or preprocessing block 402 outputs (e.g., signal Z 424 and the illustrated intermediate signal 427 (x') corresponding to an output of the nonlinear combiner 404). For example: in some embodiments DPD 400 may include a temperature preprocessing block and its output may be received by the postprocessing blocks 450. In some embodiments, the postprocessing blocks 450 compensates for RF components which may distort the input signal prior to the RF transmit components. For example: if the configuration of a beamformer, filter, or other circuit prior to PA is adjusted and as an undesirable byproduct also attenuates the pre-distorted signal 122, the pre-distorted signal 122 can be modified accordingly by the postprocessing block 450 to compensate for the attenuation. Note that the postprocessing blocks 450 may also include one or more additional signals (e.g. 428), which may correspond to control signals from additional state actuation control blocks and/or exogenous signals among other types of signals above.

Figure 4C:
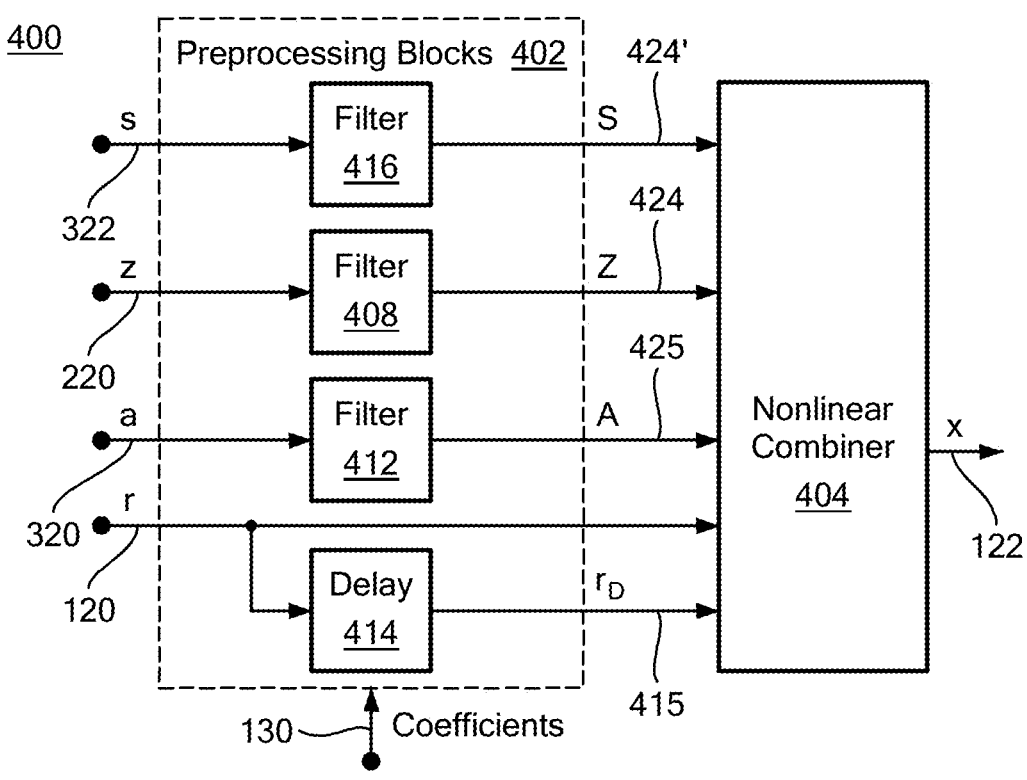

Turning to FIG. 4C, in which like elements are shown using like reference designations, an embodiment of DPD 400 is shown including two or more control signals (control signal 220, z, and level select signal 322, s) as inputs. As one with skill in the art may appreciate the disclosure herein may apply to n number of control signal inputs, where n is an integer greater than one. As shown and described above with respect to FIG. 3, control signal 220 (z) may be level select signal 322. In other embodiments, there may be more than one control signal 220. For example, in the illustrated embodiment shown in FIG. 4C there are two control signals: one corresponding to the level select signal 322 (s) and one corresponding to control signal 220. Control signal 220 may be provided by any of the control blocks described herein. Each control signal may be provided as an input to a preprocessing block 402. The outputs of the preprocessing blocks 402 (for example preprocessed signals S, Z, A and rD) may be combined and/or otherwise provided to a nonlinear combiner 404 for generating pre-distorted signal 122 (x).

Figure 4D:
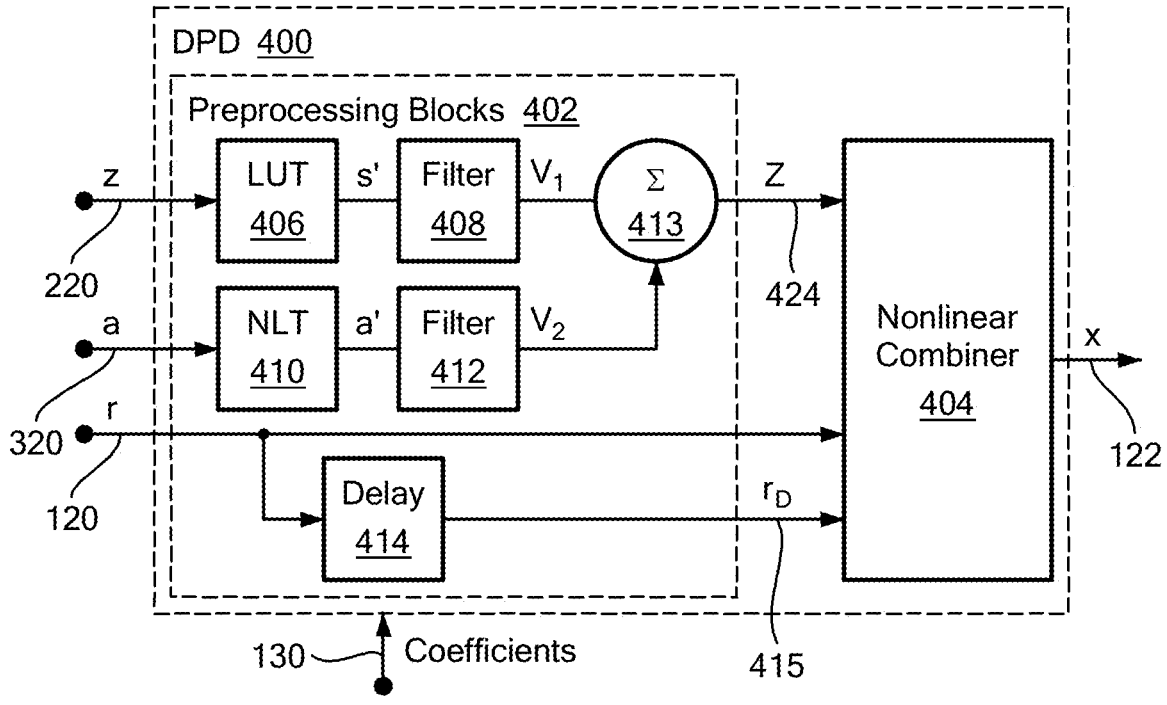

Turning to FIG. 4D, in which like elements of FIGS. 1-4C are shown using like reference designations, illustrated is a DPD 400 configured to digitally pre-distort an RF signal to be transmitted. DPD 400 may be the same as or similar to DPD 102 and 400 of FIGS. 1-4C, for example. DPD 400 can convert input signal 120 (e.g., a digital baseband signal in IQ notation) into pre-distorted signal 122. DPD 400 can also receive, as input, amplitude signal 320 corresponding to the amplitude component of input signal 120, a control signal 220, and one or more coefficients 130 provided by a solver (e.g., solver 104 of FIG. 3). Control signal 220 may correspond to, for example, level select signal 322 of FIG. 3 or any other signal used to control or actuate a system state within a transceiver such as control signal 220 of FIG. 2A. Similar to other embodiments, in some cases, control signal 220 may correspond to a translated version of a control signal. For example, a preprocessing block external to DPD 400 may be used to translate a control signal (e.g., signal 220 of FIG. 2) prior to input to the DPD (e.g., by converting it from a discrete voltage level into a transient analog signal). Signals 120, 320, and 220 are collectively referred to herein as the DPD input signals. In other embodiments, a DPD may receive different types and numbers of input signals.

DPD 400 can include one or more preprocessing blocks 402 and a nonlinear combiner 404. Preprocessing blocks 402 can include various numbers and types of preprocessing blocks arranged in various topologies depending on their intended application. In general, preprocessing blocks 402 can include at least one block to receive a corresponding one of the DPD input signals. The outputs of preprocessing blocks 402 (or combinations of said outputs) may be provided to nonlinear combiner 404, which in term combines those outputs in various ways to generate the pre-distorted signal 122. Specific examples of preprocessing blocks and nonlinear combiners are disclosed herein. More generally, a group of preprocessing blocks 402 can collectively receive one or more input signals and operate on those signals to provide one or more preprocessed signals.

In the example of FIG. 4D, processing blocks 402 are shown including: a first filter 408, a second filter 412, a look up table LUT 406, a nonlinear transformation (NLT) 410 and a delay 414. In general, a DPD preprocessing block can include any type of digital element, component, or block configured to operate on a signal, including but not limited to a LUT, algorithm, polynomial, filter, nonlinear transformation, mathematical operator (e.g., sum, multiplication, inverse), multiplexer (and/or other combinatorial logic), resampler, interpolator, decimator, and/or a delay. The preprocessing blocks 402 shown here as each having a single input and a single output may, in other embodiments, have one or more input and/or one or more output. The preprocessing blocks may receive, as input, an output from another preprocessing block. As one with skill in the art may appreciate, two or more preprocessing blocks may be arranged and/or combined in series and/or parallel configurations as may be required to preprocess the input signals for further processing by the nonlinear combiner 404. For example, in the embodiment illustrated in FIG. 4D, LUT 406 and the first filter 408 are shown in a series (sometimes referred to as cascade) arrangement having a combined output $V_1$. Similarly, the NLT 410 and the second filter 412 are shown in a series (sometimes referred to as cascade) arrangement having a combined output $V_2$. Signals s' and a' represent respective outputs of the LUT 406 and NLT 410, which are illustrated as intermediate signals between preprocessing blocks. However, it should be appreciated that in some embodiments these preprocessing blocks which are illustrated as separate blocks may be combined directly thereby having no intermediate signal. The outputs $V_1$ and $V_2$ are illustrated being combined together (thus in a parallel configuration) by means of a summing preprocessing block 413 where these outputs of two separate preprocessing blocks with the same or separate inputs are shown be combined to a single output.

Delay block 414 is shown to output a signal 415 ($r_D$) corresponding to a delayed version of input signal 120. The nonlinear combiner 404 weights and combines delayed and not-delayed versions of the input signals together to create the pre-distorted signal x which depends on both the present value (not-delayed) of inputs and the historical value (delayed) of inputs. Similarly, any input to the nonlinear combiner (i.e. Z 424) may be delayed as a means of incorporating memory into the DPD model. The model is said to have memory when the output depends on both the present and historical values of the inputs. One way to incorporate memory into the DPD model is therefore to provide as input delayed versions of the input signals.

FIG. 5 shows an example of a filter-type processing block that may be provided within a DPD, according to some embodiments. Illustrative filter 500, which may be described as a finite impulse response filter, includes a plurality of unit delays 502a, 502b, 502c, . . . , 502m (502 generally), a plurality of taps 504a, 504b, 504c, 504d, . . . , 504n (504 generally), and a plurality of summation elements 506a, 506b, 506c, . . . , 5060 (506 generally). In the example shown, m=0=n−1. Filter 500 may use one or more of the coefficients provided by a solver (e.g., solver 104 of FIG. 3). In more detail, taps 504 may be configured using solver-provided coefficients b0 to bn. In this example, filter 500 may correspond to first filter 408 of FIG. 4, receiving control signal 220 (which may correspond to any control signal including but not limited to level select signal 322 (s) in the case of supply modulation) as input and providing preprocessed Z 424 as output. Preprocessed signal Z 424 may be provided directly to the nonlinear combiner 404, provided as an input to one or more additional preprocessing block 402, and/or otherwise provided for combination (summation and/or multiplication) with other signals.

FIG. 6 shows an example of a nonlinear combiner that may be provided within a DPD, according to some embodiments. For example, illustrative nonlinear combiner 600 may be the same as or similar to nonlinear combiner 404 of FIGS. 4A and 4B.

Nonlinear combiner 600 comprises an absolute value block 602 denoted ABS( ) operators 604*a-b*, multiplication elements (or "multipliers") 606*a-b* and 608*a-b*, and a summation element 610. The various elements 602-610 may be arranged and connected so as to apply a third order polynomial to input signal 120 resulting in pre-distorted signal 122.

Input signal 120 ($r$) is provided as input to absolute value block 602 to produce amplitude signal 320 ($a$). In some embodiments, absolute value block 602 may for example be a CORDIC or half-CORDIC. In other embodiments, a transmitter may include a CORDIC external to the DPD and, thus, amplitude signal 320 may be provided as an input to the DPD and its nonlinear combiner (such as illustrated in FIG. 3). Thus, absolute value block 602 may be omitted from nonlinear combiner 600 in some cases. Further, the amplitude signal 320 may be produced from an input signal 120 using an alternate block implementing similar functionality to a CORDIC and/or a half-CORDIC.

As illustrated in FIG. 6, one or more basis functions may be created from the input signal 120. To provide a first basis function, a first operator 604*a* ($\lambda 1$) creates a signal 620*a* (a1) by exponentiating the amplitude signal 320 ($a$), which signal 620*a* is multiplied by input signal 120 via a first multiplier 606*a*. To provide a second basis function, a second operator 604*b* ($\lambda 2$) creates a signal 620*b* (a2) by exponentiating the amplitude signal 320 ($a$), which signal 620*b* is multiplied by input signal 120 via a second multiplier 606*b*. The two exponentiations may be performed using different powers, for example. Other operators may be used to create basis functions, such as exponentiators to create polynomial basis functions. A third basis function may correspond to the input signal 120. Multipliers 608*a*, 608*b*, and 608*c* apply coefficients $k_1$, $k_2$, and $k_3$ to the three basis functions, respectively, where coefficients $k_1$, $k_2$, and $k_3$ may be determined and provided by a solver (e.g., solver 104 of FIG. 2). The three basis functions, weighted by the respective coefficients $k_1$, $k_2$, and $k_3$, can then be combined by summation element 610 to produce pre-distorted signal 122 ($x$).

While FIG. 6 shows a nonlinear combiner with three (3) basis functions created from a single input signal, other numbers of input signals and/or basis functions can be used.

FIG. 6 illustrates a method or technique, referred to as a static nonlinearity sub-model, that can be used within a nonlinear combiner to compensate for static nonlinearity of a transceiver. Though the embodiment illustrated in FIG. 6 (e.g., $3^{rd}$ order static nonlinearity) is discussed as a method to compensate for PA distortion, techniques herein may be applied to compensate distortion related to components throughout the transceiver system. Static nonlinearity compensation can include compensation for change in gain vs. input amplitude (AM/AM) and change in phase vs. input amplitude (AM/PM). In the example of a PA, these characteristics change with supply voltage, so static linearization characteristics of a DPD must be adjusted independently for each supply voltage level. The static nonlinearity sub-model of FIG. 6 may assume that the supply voltage (and thus the AM/AM and AM/PM characteristics compensated) is fixed.

In some embodiments, a subset of coefficients provided by the solver can include polynomial coefficients $k_1 \ldots k_n$ which may be varied with the supply voltage level because said coefficients are indexed to the supply voltage level. If for example, the supply voltage level changes, it may be desirable to use a different set of polynomial coefficients. Varying the polynomial coefficients with the supply voltage level can help to ensure that the coefficients being utilized are appropriate for the given supply voltage level.

While FIG. 6 shows an example of a nonlinear combiner employing a static nonlinearity sub-model, the general concepts, structures, and techniques sought to be protected herein are not limited to any particular type of nonlinear combiner design or implementation.

Figure 7:
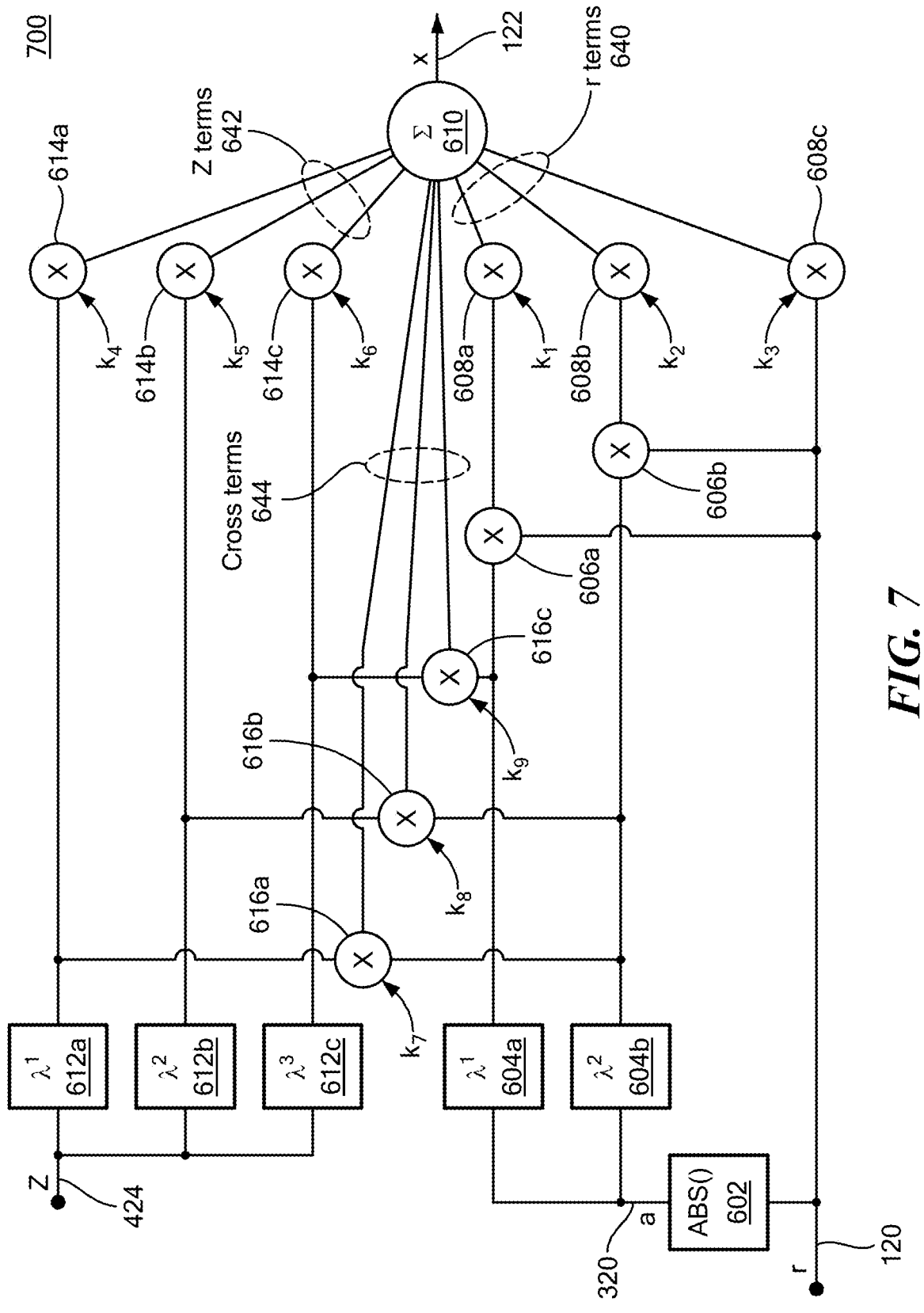

Turning to FIG. 7, in which like elements of FIG. 6 are shown using like reference designations, illustrated is another example of a nonlinear combiner 700 that may be provided within a DPD. The method or technique illustrated in FIG. 7 may be used to compensate for changes in PA gain and phase given changing input signals.

In this example, there are two combined static nonlinearity sub-models to account for two input signals, namely the input signal 120 ($r$), which may be a complex baseband signal as previously discussed, and the pre-processed input signal 424 (Z), which may be real-valued. The pre-processed input signal 424 may be generated and provided to nonlinear combiner 700 using one or more preprocessing blocks 402, such as illustrated in FIG. 4A-C. The approach of FIG. 7 may be contrasted with that of FIG. 6, in which only changes due to the (complex) input signal 120 are compensated.

The first sub-model, comprising elements 604*a-b*, 606*a-b*, and 608*a-c* contributes basis functions from the input signal 120 as described in FIG. 6. These basis functions produce terms 640 ("r terms") which are provided as inputs to summation element 610.

The second sub-model, comprising operators 612*a-c* and multipliers 614*a-c*, contributes basis functions from a second input, in this case pre-processed input signal 424. These basis functions produce terms 642 ("Z terms") which are also provided as inputs to summation element 610. Similar to the r terms 640, the Z terms 642 can be weighted by solver-provided coefficients, here shown as coefficients k4, k5, and k6, and the weighted terms can be provided as additional inputs to summation element 610.

Additional terms 644 ("cross terms") can be created by combining basis functions of different inputs, for example by multiplying outputs of operators 604*a-b* with outputs of operators 612 using multipliers 616*a-c*, such as shown. The cross terms 644 can also be weighted by solver-provided coefficients, here shown as coefficients k7, k8, and k9, and the weighted terms can be provided as further inputs to summation element 610. Cross terms 644 can be used to compensate for distortion which is inter-dependent on both input signals.

It should be appreciated that the exemplary nonlinear combiner structure is only one implementation of the nonlinear combiner. The nonlinear combiner may be implemented by any mechanism that combines and transforms the input signals (e.g., signals 120 and 424) and produces the output signal (e.g., pre-distorted signal 122). In other implementations, a nonlinear combiner may be implemented as an n-dimensional look-up table.

As previously discussed, the pre-processed input signal 424 (Z) provided as input to a static nonlinearity sub-model can be generated using at least one preprocessing block (for example preprocessing blocks 402 of FIG. 4A-C) external to that sub-model with knowledge of the level select signal 322 (FIG. 3).

In prior art approaches to digital supply modulation pre-distortion, pre-processed input signal 424 may be used as an index to select among sets of DPD 102 coefficients 130. In the example of digital supply modulation the commanded voltage level s 322 would be used as an index to select a set of DPD coefficients specific to a given supply voltage level.

By contrast, in this approach the commanded voltage level s 322 is pre-processed within the DPD 102 and the output used in part to form an intermediate signal representing the PA supply voltage 324. The intermediate signal derived from the control signal 322 is algebraically (or mathematically, e.g. by addition or multiplication) combined with other signals to form the pre-distorted signal 122, and not used as an index to select appropriate DPD coefficients.

The preprocessing block or blocks may estimate the behavior of pre-processed input signal 424 during transition from one voltage level to another. Other behavior of pre-processed input signal 424 can also be modeled to provide an even better estimation of the gain and phase compensation required to produce a linear output from the PA. For example, in the case of supply modulation a PMC output voltage error dependent on PA input current, input signal 120 bandwidth, or system operating temperature may be modeled and included in pre-processed input signal 424. This technique of estimating time-varying pre-processed input signal 424 based on a digital control signal (e.g., level select) and exogenous inputs (e.g., signal bandwidth or operating temperature), and applying the estimate to DPD for accurate compensation may be applied to all types of digital transceiver controls. Several examples are provided herein.

In the case of PA supply modulation, nonlinear combiner 700 may use the pre-processed input signal 424' (S, shown in FIG. 4C) to correct amplitude (AM/AM) and phase (AM/PM) distortion of the PA 108 by creating the pre-distorted signal 122 which will cause the PA to produce the desired RF output signal ($Y_{RF}$) equivalent to an amplified version of the input signal 120.

The nonlinear combiner 700 of FIG. 7 combines (in a nonlinear fashion) two inputs (i.e., signals 120 and pre-processed input signal 424) to produce pre-distorted signal 122. When used in a transmitter (e.g., transmitter 200 of FIG. 2), nonlinear combiner 700 can help reduce non-idealities in an RF output signal (e.g., signal 126 of FIG. 2). The number of type of inputs to nonlinear combiner 700 are not intended to be limiting. For example, in other embodiments, a nonlinear combiner may receive as input signals corresponding to other actuated system states and conditions which will be described in more detail below. Moreover, the general approach described herein is not limited to supply modulation but can be implemented for various actuated system states.

While FIG. 7 illustrates nine (9) basis functions and corresponding coefficients $k_1$-$k_9$, it should be appreciated that any number of basis functions may be constructed based on additional inputs and cross-terms between basis functions created from those inputs. Furthermore, basis functions beyond the polynomial examples shown in FIG. 7 may be constructed using any mathematical operator or combination of operators.

Figure 8:
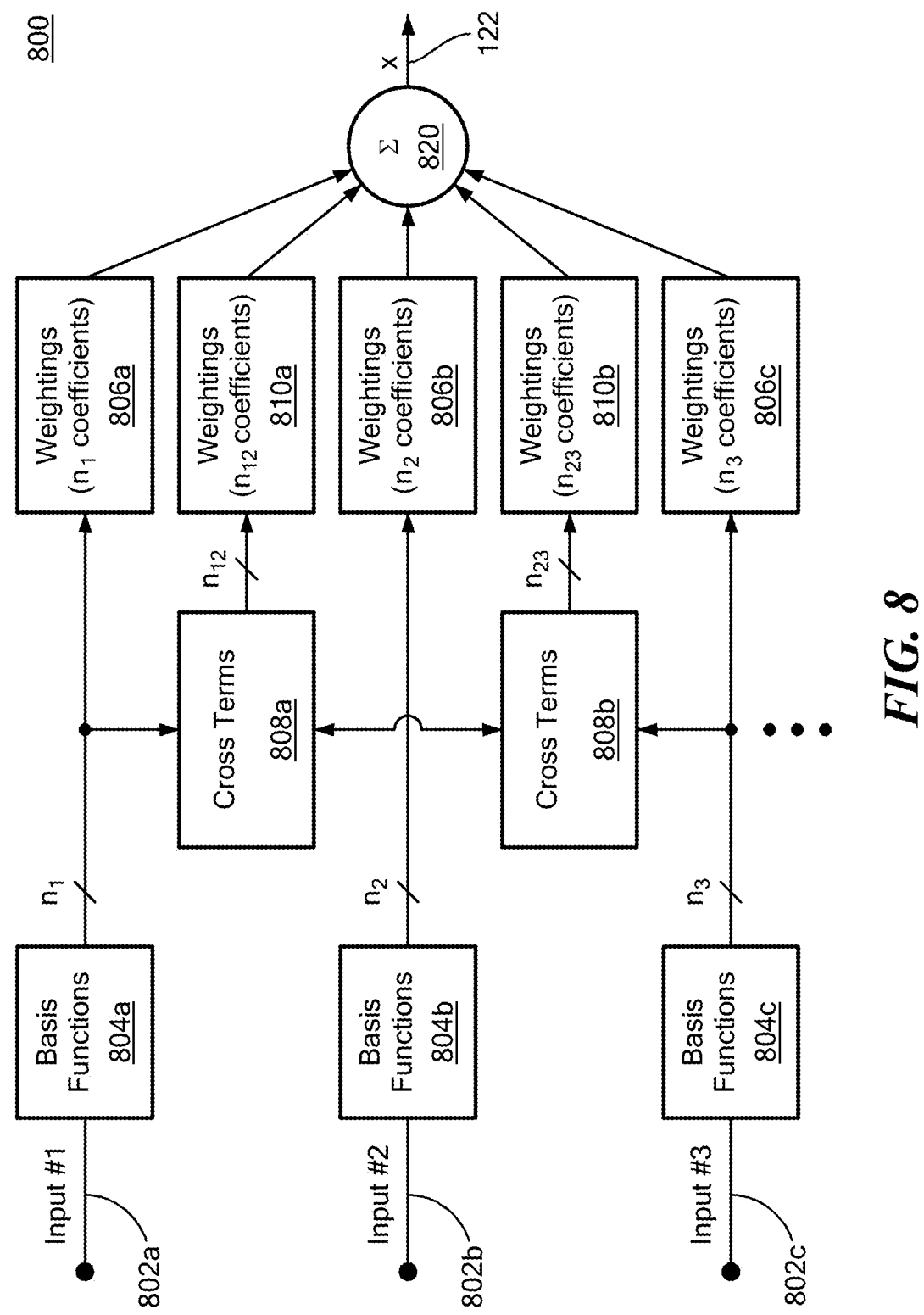

FIG. 8 illustrates how the techniques and methods described above can be used to provide a generalized nonlinear combiner 800 having an arbitrary number of inputs 802*a*, 802*b*, 802*c*, etc. (802 generally), according to some embodiments. At least one of the inputs 802 may correspond to a transmitter input signal (e.g., input signal 120 of FIG. 7). In some cases, another one of the inputs 802 may correspond to a pre-processed input signal (e.g., signal 424 of FIG. 7). In some cases, another one of the inputs 802 may correspond to an additional pre-processed input signal (e.g., signal 424' of FIG. 4C). Therefore, it is contemplated that the DPD 400 can receive, and the nonlinear input can combine any number of input control signals.

For each input 802, one or more basis functions 804 may be applied to produce one or more terms. For example, basis functions 804*a* may be applied to input 802*a* to produce $n_1$ terms, basis functions 804*b* may be applied to input 802*b* to produce $n_2$ terms, basis functions 804*c* may be applied to input 802*c* to produce $n_3$ terms, etc. These various terms can be weighted using corresponding numbers of coefficients provided by a solver. For example, weightings 806*a* can utilize $n_1$ coefficients to weight the $n_1$ terms produced for input 802*a*, weightings 806*b* can utilize $n_2$ coefficients to weight the $n_2$ terms produced for input 802*b*, and weightings 806*c* can utilize ns coefficients to weight the ns terms produced for input 802*c*, etc. The weightings 806 can be implemented using multipliers such as illustrated in FIGS. 6 and 7.

Additional terms can be produced by crossing terms produced for different ones of the inputs 802. For example, $n_{12}$ additional terms may be produced by crossing (block 808*a*) terms for inputs 802*a* and 802*b*, and $n_{23}$ additional terms may be produced by crossing (block 808*b*) terms for inputs 802*b* and 802*c*, etc. In general, terms for any (or all) pairs or combinations of inputs may be crossed to produce extra terms (e.g., inputs 802*a* and 802*c* could be crossed in another example). The extra terms can also be weighted. For example, weightings 810*a* can utilize $n_{12}$ coefficients to weight the $n_{12}$ additional terms produced by block 808*a*, weightings 810*b* can utilize $n_{23}$ coefficients to weight the $n_{23}$ terms produced by block 808*b*, etc.

The various weighted terms can be combined using summation element 820 to produce pre-distorted signal 122, as shown.

It should be appreciated that this generalized technique can be utilized to incorporate n number of input signals including a transmitter input signal and/or other signals estimated by preprocessing functions. Any such signals described herein may be provided as an input to a nonlinear combiner for digital pre-distortion, according to the present disclosure.

A Volterra-derived transfer function may be realized by a combination of appropriate preprocessing blocks and the nonlinear combiner. For example, consider a nonlinear combiner with three inputs: input signal 120 (*r*), input signal 120 (*r*) delayed by a one-sample preprocessing block, and input signal 120 (*r*) delayed by a two-sample preprocessing block. It is appreciated herein that such a DPD may be configured to realize a full Volterra series with memory depth of three samples and nonlinear order according to the selection of nonlinear combiner basis functions (e.g., operators 604*a*-*b*).

Figure 9:
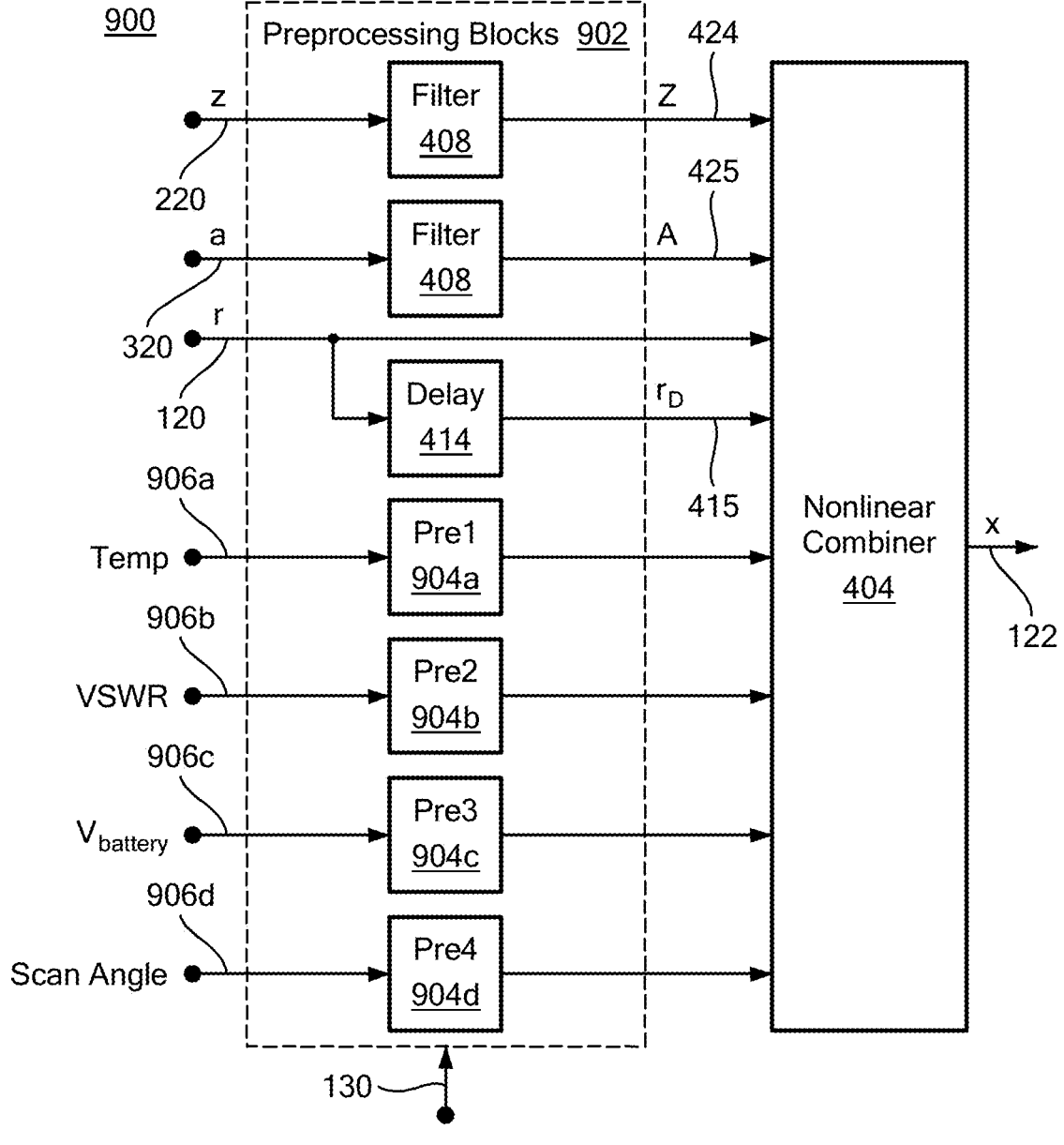
FIG. 9 is a block diagram showing another example of a DPD that may be provided within an RF transceiver including additional inputs for control signals and exogenous signals, according to some embodiments.

Turning to FIG. 9 in which like elements of FIG. 4 are shown using like reference designations, illustrated is an example of a DPD 900 configured to correct for exogeneous disturbances. In addition to transmitter input signal 120, DPD 900 can receive as input amplitude signal 320, one or more control signal 220 (*z*) (e.g., signals used to control or actuate a transceiver system state such as level select signal 322), and one more exogenous signals or inputs 906*a*, 906*b*, 906*c*, 906*d*, etc. (906 generally). Exogenous signals 906 may be responsive to exogenous system conditions that produce distortions and non-idealities.

The illustrative DPD 900 comprises preprocessing blocks 902 which can include, for example, blocks 408 and 414 previously discussed. In addition, preprocessing blocks 902 may include one or more blocks 904a, 904b, 904c, 904d, etc. (904 generally) for preprocessing respective exogenous inputs 906a, 906b, 906c, 906d, etc. Such preprocessed inputs may be used by nonlinear combiner 404 to enhance pre-distorted signal 122.

In general, one or more preprocessing blocks may be provided for each exogenous input 906, with those blocks arranged in a series and/or parallel configuration and configured to produce (or contribute to the production of) a signal correlated with a disturbance, thereby compensating for the disturbance and enhancing predistortion. Preprocessing blocks 904 can include any types of preprocessing blocks described above in the context of FIG. 4A-C, such as LUTs, filters, NLTs, delays, etc. configured to model the corresponding exogenous system conditions or disturbances. Variations in the exogenous inputs 906 can be used to continuously adjust the pre-distorted signal 122 of the DPD 900, compensating for exogenous disturbances in the same way that supply voltage is constantly modeled and used to compensate the effect of discrete supply modulation.

In the example shown, preprocessing blocks 902 can further include block 904a to receive a temperature input 906a, block 904b to receive a voltage standing wave ratio (VSWR) input 906b, block 904c to receive a battery voltage ($V_{battery}$) input 906c, and block 904d to receive a scan angle (i.e., the angle of highest directivity for a beamforming array) input 906d. Each of these non-limiting examples of exogenous inputs are discussed in more detail below.

Temperature input 906a may be a signal or value responsive to instantaneous system temperature changes due to the environment, adjacent components, etc. A change in temperature can impact transceiver distortion response, and DPD 900 can be configured to reflect the updated distortion characteristic. Temperature information can be used by nonlinear combiner 404 directly and/or manipulated by preprocessing block 904a (as shown) to create an input to nonlinear combiner 404 to correct for such an exogenous time-varying disturbance. Temperature may be measured using an electrical circuit configured to measure temperature (e.g., a silicon bandgap temperature sensor or other type of temperature-sensing circuit known in the art) implemented near and/or as part of the transmit chain.

VSWR input 906b may be a signal or value responsive to a VSWR angle and magnitude caused by environment or other factors, which presents a different load to the PA RF output (e.g., RF output signal 126 in FIG. 2) and impacts AM/AM and AM/PM characteristics. This signal/value or a version modified by preprocessing block 904b can be used by nonlinear combiner 404 to correct for such an exogeneous time-varying disturbance. VSWR may be measured at the antenna (e.g., antenna 112 of FIG. 2) or communicated to the transmitter from an external device.

Battery voltage input 906c may be a signal or value responsive to a voltage of a system battery or other transceiver power source (in some cases called a power delivery network). Battery discharge or connection to a battery charger may impact behavior of the transceiver (e.g., a PMC input and output voltage levels). This signal/value or a version modified by preprocessing block 904c can be used by nonlinear combiner 404 to correct for such an exogeneous time-varying disturbance. Battery voltage variation may be measured at the battery or otherwise communicated from within and/or as part of the transmit chain.

Scan angle input 906d may be a signal or value responsive to a scan angle of a transceiver antenna (e.g., a beamforming array antenna), wherein the relative phase adjustment of adjacent elements causes a change in the load presented to the PA RF output and impacts AM/AM and AM/PM characteristics. Scan angle input 906d or a version modified by preprocessing block 904d can be used by nonlinear combiner 404 to correct for such an exogeneous time-varying disturbance. In some cases, beamformer scan angle may be controlled by a modem, and such beamformer control information may be communicated to the DPD as scan angle input 906d. As mentioned earlier in this disclosure the DPD may also compensate for undesirable changes in beamformer characteristics as scan angle is adjusted. For example, a postprocessing block (such as those shown in FIG. 4B) may be used to increase or decrease attenuation of the pre-distorted signal x in response to the scan angle input signal 906d.

In some embodiments, the one or more exogenous input signals responsive to a system condition are values (not shown) representative of instantaneous or average output signal variation of other transmitters or antennas (not shown) which may or may not be connected to the same PMC. In the case of other amplifiers connected to the same PMC, the output power level (e.g., average output power) of other amplifiers may lead to deviation from expected average or instantaneous supply voltage at PMC level outputs. In the case of other transmitters operating in close proximity (e.g., having antennas within 20 cm of each other), the transmission of the other amplifiers can cause reverse intermodulation distortion (RIMD). Thus, for example, the exogenous signal can be based at least in part on a power level of another transmit chain configured to operate simultaneously with the subject transmit chain. In some cases, the two transmit chains may be managed by a common PMC. In some cases, the two transmit chains may be provided as part of a common device (e.g., on the same mobile device, base station, etc.). The instantaneous and/or average output power from other power amplifiers can be used by nonlinear combiner 404 to correct for exogeneous time-varying disturbances such as deviation from expected voltage levels in the PMC, or for correction of RIMD.

Figure 10:
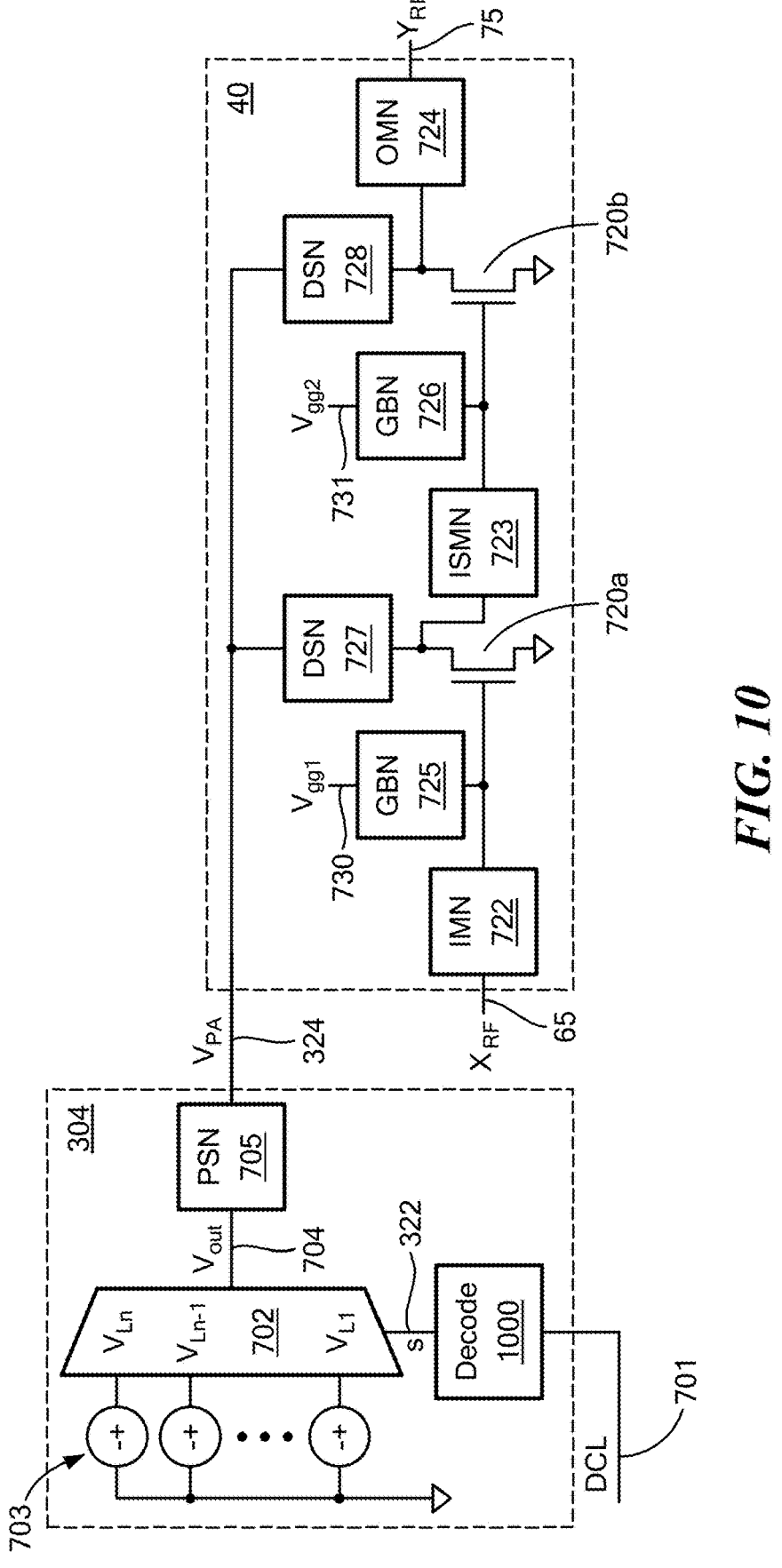
FIG. 10 is a block diagram showing an example of a supply modulated RF transmitter, according to some embodiments.

FIG. 10 shows further detail of an embodiment of the supply modulated transmitter shown in FIG. 2A, in which like elements of FIG. 2A are show using like reference designations. PMC 304, which is connected to the PA 40, may correspond to state actuation circuit 204 referred to in FIG. 2A, for example. The PMC 304 is represented by n voltage sources 703 and a multiplexer (called a supply modulator) 702 which selects one of the voltage levels to be directed to the output $V_{out}$ 704. The level select signal 322 determines which of the voltage levels should be connected to the output. In some implementations, the information of level select signal 322 (*s*) is encoded and carried from the transceiver to the PMC 304 on a custom physical interconnection to optimize interface power, clock rate, or number of physical wires connecting the transceiver level select 302 to the PMC 304. A decode block 1000 can be provided to decode and recover information of level select signal 322 (*s*) from DCL 701. The pulse shaping network (PSN 705) is an electrical serving to shape steps in the discrete output voltage $V_{out}$ and produce the PA supply voltage 324 ($V_{PA}$). As one with skill in the art may appreciate, the term supply voltage as used herein may refer to Vdd or Vcc depending on the type of PA transistor technology used for the amplifying transistor and is intended to refer to the PA supply voltage 324 ($V_{PA}$).

The PA 40 of FIG. 10 is shown in this embodiment as a two-stage RF amplifier having signal 65 ($X_{RF}$) as its input and an amplified version of the signal 75 ($Y_{RF}$) as its output. The first-stage transistor 720$a$ is designed together with an input impedance matching network (IMN) 722 and inter-stage impedance matching network (ISMN) 723 for desirable RF performance (e.g., the gain, phase, and/or efficiency behavior, the variation of the behavior, with respect to $V_{PA}$, etc.). The gate bias network (GBN) 725 provides DC bias $V_{gg1}$ 730 to the gate of transistor 720$a$. The Drain Supply Network (DSN) 727 provides PA supply voltage 324 ($V_{PA}$) to the drain of transistor 720$a$. A second-stage transistor 720$b$ along with GBN 726, DSN 728, OMN 724, and ISMN 723 can be arranged in a similar manner to realize a second RF stage, as shown.

Behavior of the two-stage RF PA 40 is dependent on the gate bias voltages $V_{gg1}$ and $V_{gg2}$; the IMN, ISMN, and OMN; and the PA supply voltage 324 ($V_{PA}$). In the case of discrete supply modulation, the PMC 304 output voltage level $V_{out}$ 704 is commanded by the signal DCL 701 to adjust PA supply voltage 324 ($V_{PA}$). Relating FIG. 10 to FIG. 2A, the PMC 304 serves as a state actuation circuit 204 under influence of the control signal 220 (in this case level select signal 322) determined by state actuation control unit 202 (in this case a Level Select 302). Adjustments to any aspect of the PA (e.g., $V_{gg1}$, $V_{gg2}$, IMN, ISMN, OMN, $V_{PA}$) may have an impact on PA performance and performance tradeoffs (e.g., efficiency vs linearity for example). Changes in PA linearity (instantaneous PA gain and PA phase) will cause distortion in the output signal 75 ($Y_{RF}$) if not compensated. The technique for pre-distortion described herein compensates distortion caused by adjustment to the PA aspects.

One with skill in the art may appreciate that the simplified block diagram of FIG. 10 gives way to more complex implementations of PA 40 and PMC 140, but the discrete supply modulation behavior described herein is substantially similar.

It will be appreciated that different types of transistors can be biased by applying either a current or a voltage to a particular terminal, as previously discussed. For example, a bipolar junction transistor (BJT) may be biased by applying a current to the base terminal, and a field-effect transistor (FET) may be biased by applying a voltage to its gate terminal. Thus, while certain embodiments are described herein in terms of "gate" bias modulation, the general structures and techniques described herein are applicable across all transistor technologies. For example, this approach may be applied to BJT transistors by adjusting the bias current of the base terminal.

Figure 11:
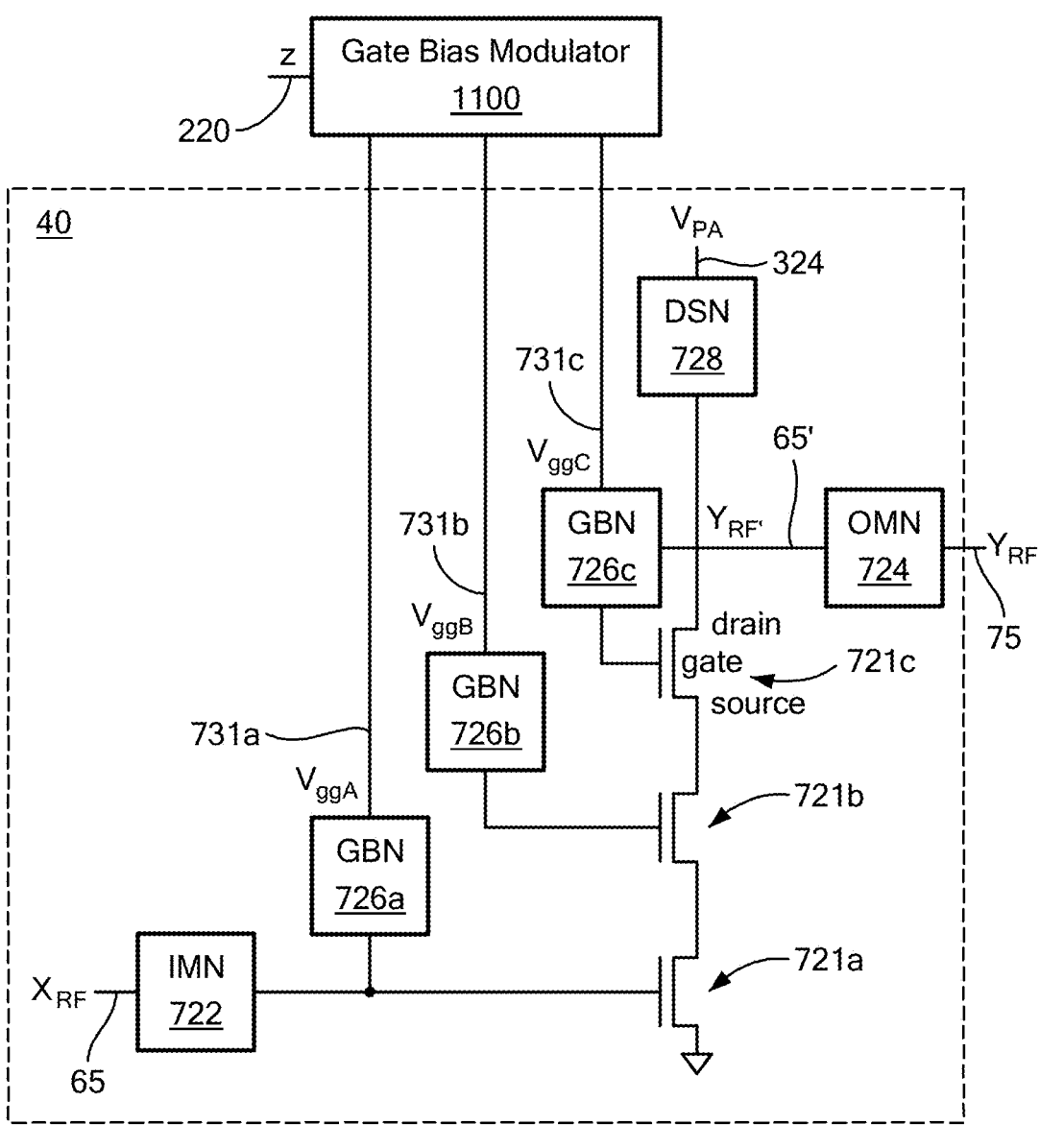
FIG. 11 is a block diagram showing an example of a gate bias modulated RF transmitter, according to some embodiments.

As shown in FIG. 11 in which like elements of FIG. 2A are show using like reference designations, in some embodiments the state actuation control unit 202 of FIG. 2A may include a gate bias modulation control (or "gate bias modulation circuit") for varying a gate bias of one or more PA. For example, the transceiver may include a gate bias modulation circuit 1100 (corresponding to state actuation circuit 204) configured to modulate an observed gate bias of the PA during operation to improve performance characteristics of the PA. FIG. 11 shows an embodiment of the PA 40 making use of stacked transistors 721$a$, 721$b$, and 721$c$. This approach can be helpful in producing large RF voltage swings (and therefore large RF output power) using transistors having desirable RF characteristics but low voltage rating. However, the gate bias voltages 731$a$-$c$ ($V_{ggA-C}$, 731 generally) must be controlled to keep the voltage difference between gate and source ($V_{gs}$) and voltage difference between gate and drain ($V_{gd}$) of each transistor 721$a$-$c$ within the useful and safe operating range. If the voltages become too large the transistor may be damaged or destroyed. If the voltages deviate from design target voltage, then the RF performance (e.g., linearity, efficiency, saturated power, etc.) is degraded.

For example, it may be desirable for the gate bias modulation control to actively adjust the gate voltage bias (or base current bias) during transmission, which actively determines the bias point for the PA. Adjustment of the bias may change the nonlinear characteristics of PA, the efficiency, and/or the maximum output power of the PA (saturated power, or $P_{sat}$). Adjustment of the bias point may be beneficial or critical to keep each PA in a safe operating condition (for example, voltage across two terminals or current into a terminal), and prevent damage. It may be especially important to actively control the gate voltages 731 of the stacked transistors under supply modulation of the PA supply voltage 324 ($V_{PA}$).

Adjustment of the gate voltage bias (or base current bias) can be performed as a continuous analog or discrete adjustment in bias voltage (similar to discrete PA supply modulation discussed earlier). Adjustment of the gate voltage bias could be coordinated with RF input signal (e.g., power, bandwidth, frequency, etc.), other system controls (e.g., modulated supply voltage, etc.), and/or system state (e.g., temperature, VSWR, etc.). For example, in some embodiments control may be adjusted along with changes to drain or collector supply voltage to enhance RF performance (e.g., efficiency, linearity, or $P_{sat}$). In some embodiments, control may be adjusted with temperature to enhance RF performance. In some embodiments, control may be adjusted to one or more transistors in a stack of transistors to keep each of the gate-to-source and gate-to drain voltages maintained at a safe level. Active adjustment of individual gate-to-source and gate-to-drain voltages may be especially important for stacked PA under supply modulation. In some embodiments, control may be adjusted for each component of a multi-amplifier PA topology. For example, in some embodiments this may include carrier and peaking stages of a Doherty amplifier system. In other embodiments, the gates of each input to the combiner of an out-phasing amplifier system may be individually adjusted.

The gate bias modulation control's output, a control signal 220 ($z$), is communicated or otherwise provided as an input to the gate bias modulation circuit 1100 and also to a preprocessing block (e.g., preprocessing elements 402 of FIG. 4A and FIG. 4B) of the DPD 102 which has an output signal correlated with the resulting change in PA behavior to be compensated. Depending on implementation and desired behavior of the gate bias modulation circuit 1100, the control signal 220 ($z$) may take the form of an n-bit sampled signal representing a continuously varying (continuous time) analog signal, or it could take the form of a digital index signal representing one of many discrete states (as in the case of supply modulation). Nonlinear combiner 404 can incorporate the output of the preprocessing block into the pre-distortion signal provided to the transmitter.

Gate bias modulation circuit 1100 of FIG. 11 may be implemented in various ways to provide discrete or continuously varying control of any number of gate bias voltages 731. In some embodiments the various gate bias voltages may be related by a fixed ratio, such as could be implemented with a resistive divider network. In other embodiments the various gate bias voltages may be independently generated using active circuitry. In still other embodiments the gate bias voltage of one or more transistors may be modified in response to a system condition (e.g., temperature).

In some embodiments, gate bias modulation circuit 1100 may be implemented independently, co-implemented on the same integrated circuit (IC) or in the same package as the PMC 140, or co-implemented on the same IC or in the same package as the PA 40. The gate bias modulation circuit 1100 has control signal 220 ($z$) as input, which may be conveyed from the gate bias control block using an analog or digital interface. In some embodiments the interface may be similar to the DCL interface as earlier described in the context of discrete supply modulation. In some embodiments with discrete supply modulation, the input control signal 220 may be derived from a supply modulation control signal (e.g., level select signal 322, $s$) used by the PMC 304 or decoded from a DCL signal 701 used by the PMC 304.

Turning to FIG. 12A-F, in which like elements of FIG. 2A are show using like reference designations, in some embodiments the state actuation control unit 202 may correspond to a load modulation control for varying a load actuation circuit to vary the load of one or more PA. For example, it may be desirable for the load modulation control to actively adjust an output matching network (OMN, corresponding to state actuation circuit 204) which determines at least in part the PA load line. Adjustment of the control changes the nonlinear characteristic, the efficiency, and/or the maximum output power of the PA (saturated power, or $P_{sat}$). Adjustment of the control may be beneficial or critical to keep each PA in the safe operating area and prevent damage (e.g., under PA supply modulation or under the influence of antenna mismatch).

Figure 12A:
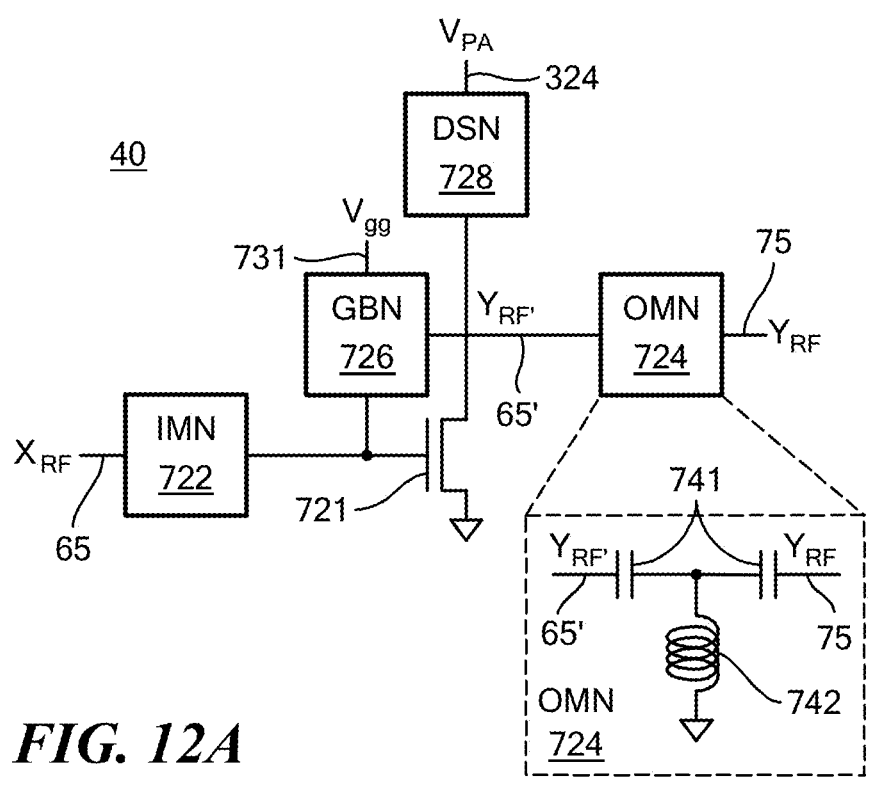
FIG. 12A shows an example of a load modulated RF transmitter, according to some embodiments.

FIG. 12A shows one embodiment of a simple PA 40 which includes an OMN 724. As shown, in one example, OMN 724' can be implemented by incorporating two series capacitors 741 and one shunt inductor 742. This example is provided by way of example and not limitation; prior art demonstrates techniques for implementation of the output matching network, some examples of which are provided herein.

FIG. 12B shows an embodiment of a reconfigurable matching network (RMN) 740 which can be provided in place of fixed OMN 724, according to some embodiments. The RMN has an RF input $Y_{RF}'$ 65' connected to the transistor drain and an RF output $Y_{RF}$ connected to output signal 75 ($Y_{RF}$), as well as a control signal 220 ($z$). The RMN 740 of FIG. 12B may be provided as the OMN 724 of FIG. 12A, for example. In some embodiments, the RMN may be an output matching network (OMN), an inter-stage matching network (ISMN), and/or an Input matching network (IMN) of a power amplifier.

FIG. 12C shows an illustrative embodiment where control signal 220 ($z$) may produce control signals 760*b-d* to actuate reconfigurable matching elements in the RMN by means of a multiplexer 743. One skilled in the art may appreciate that control signal 220 could be decoded to produce control signals for the reconfigurable matching elements using other means (e.g., combinatorial logic, state machine, etc.). In this embodiment the control signals 760*b-d* are effective to actuate exemplary reconfiguration elements (e.g., 745, 746, 747 shown in FIG. 12D) in a shunt RMN 750. In some embodiments, the general structure and technique of FIGS. 12C and 12D can be implemented as part of RMN 740 of FIG. 12B.

Figure 12D:
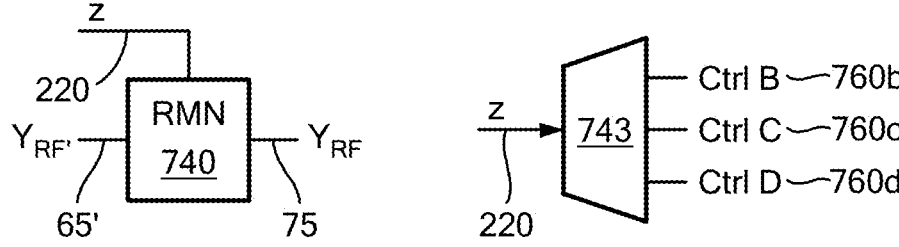
FIG. 12D illustrates reconfiguration elements that may be provided within an RMN, according to some embodiments.
Figure 12D:
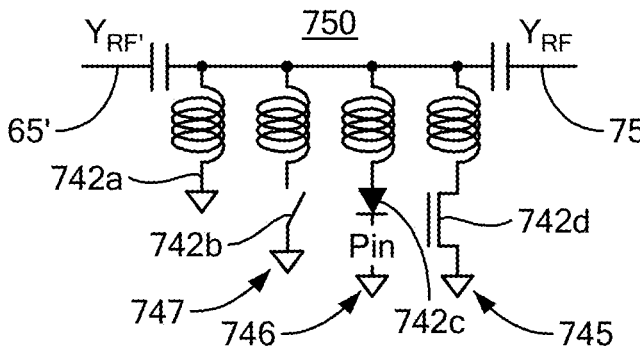
Figure 12E:
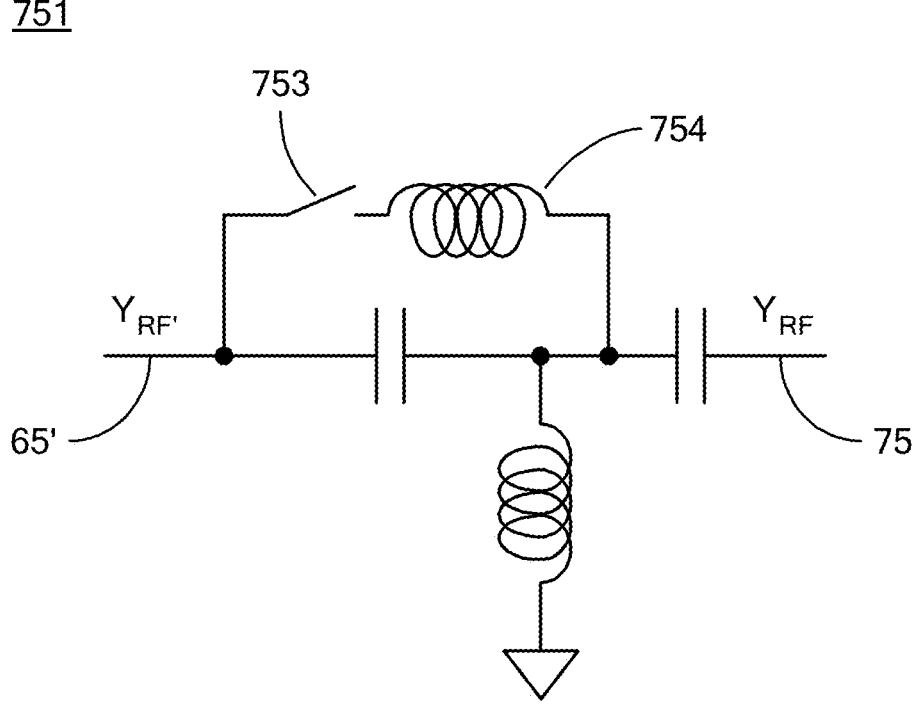
FIG. 12E shows an example of a series RMN.
Figure 12F:
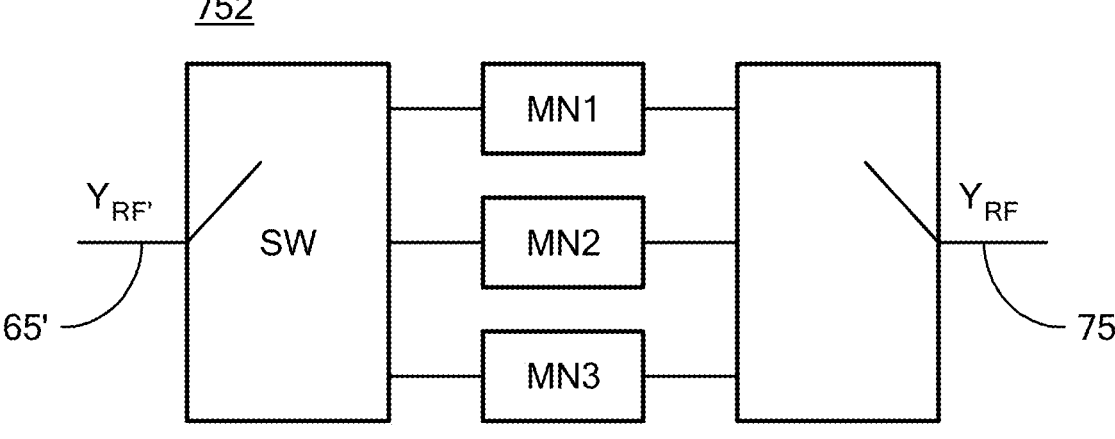
FIG. 12F is a block diagram showing an example of a switched output matching network.

A series reconfigurable matching network 751 is shown in FIG. 12E including elements 753 and 754. Different methods of OMN adjustment are known in the art. For example, the network impedance transformation may be adjusted by adding an impedance in series with another matching network element (such as illustrated in FIG. 12D) or parallel with another matching network element (such as illustrated in FIG. 12E). The network may be adjusted to discrete states by adding or removing elements from the circuit using discrete switching techniques. In some embodiments, the RMN can be configured to change abruptly from one state to another (e.g., in less than 1 microsecond, in less than 500 nanoseconds, in less than 250 nanoseconds, or in less than 100 nanoseconds).

A microelectromechanical system (MEMS) switch 742*b*, a PIN diode 742*c*, and a solid-state switch 742*d* are included in the RMN 750 to illustrate some of the reconfiguration elements known in the art. A passive element 742*a* is shown as an inductor connected to ground. A series reconfigurable matching network 751 is shown in FIG. 12E including elements 753 and 754. The RMN impedance transformation may be adjusted by adding an impedance in series with another matching network element (e.g., as in FIG. 12D) or parallel with another matching network element (e.g., as in FIG. 12E). The network may be adjusted to discrete states by adding or removing elements from the circuit using discrete switching techniques. In other embodiments, the RF signal may be switched to alternate matching network paths within a switched output matching network 752 such as that shown in FIG. 12F.

As in discrete supply modulation embodiments, the control signal 220 changes abruptly and is effectively changed at the next sample, but the effect of the control signal 220 on the reconfigurable output matching network may not be instantaneous because of the practical time constants of analog and RF circuitry.

Other impedance tuning elements also offer continuously variable impedance controls, for example the variable capacitor diode (or "varactor") wherein the reactance of the element may be adjusted by a change in the DC voltage applied to the tuning element. In such cases, the load modulation control signal may be provided to the corresponding load modulation actuation circuit as an analog continuous time signal, and provided to the corresponding preprocessing block as an n-bit sampled signal representing the continuous-time analog signal. Changes in PA behavior may not be linearly related to the control signal 220.

Continuous or discrete changes in RMN may effect changes in the PA performance (e.g., linearity, efficiency). Uncompensated changes in PA gain and phase cause distortion in the output signal 75 ($Y_{RF}$). In such cases, it may be beneficial to provide the load modulation control signal 220 to the preprocessing block 402 of the DPD 102. The preprocessing block 402 translates the control signal 220 into a signal correlated with the change in PA behavior due to the control signal. In some embodiments preprocessing blocks may include a look-up table and/or nonlinearity to translate the control signal into a signal closely correlated with the PA behavior. In discrete load modulation embodiments, a preprocessing filter may additionally be applied to create a nonlinear combiner input signal having the same or at least related response as the RMN response. The nonlinear combiner 404 can incorporate the output of the preprocessing blocks into the pre-distortion signal provided to the transmitter and is effective to improve linearity of load modulated transmitter systems.

A benefit of load modulation may be improved performance or robustness (ensuring that transistors remain in safe operating area, avoiding electrical overstress). Adjustment of the RMN could be in coordination with RF input signal characteristics (e.g., average power, bandwidth, RF center frequency), instantaneous RF input or desired signal magnitude (or envelope), other system controls (e.g., modulated supply voltage, bias voltage), or system state (e.g., temperature, VSWR). In some embodiments, the RMN may be adjusted along with changes to drain or collector supply voltage to enhance efficiency, linearity, or $P_{sat}$. In some embodiments, the RMN may be adjusted with temperature to enhance efficiency or linearity. In some embodiments, RMN may be adjusted to adjust the load line to dynamically increase $P_{sat}$ when peak instantaneous power and increase efficiency at reduced instantaneous power.

Compensation for an intended change in PA characteristics (RMN adjustment for a desired and beneficial effect, e.g., increasing $P_{sat}$) may be achieved by providing the control signal to a preprocessing block of a DPD. Compensation for an unintended change (or a change which is not directly beneficial, e.g., RMN element increasing loss and reducing gain) may also be achieved by the DPD.

In some examples, a DPD processing block (e.g., filter) can be provided and configured to model a change in gain and phase of the transmit chain due to reconfiguration of the RMN.

The load modulation control techniques can more generally be considered as techniques to adjust the impedance of any matching network. Other matching networks (e.g., IMN, ISMN, etc.) may be implemented as RMN as well to realize a variety of additional performance tradeoffs. For example, adjustment of the IMN may effect PA gain; adjustment of ISMN may effect variation in PA gain and PA phase vs. supply voltage (so-called "gain dispersion"). As such, all techniques described above may be applied at the input matching network, inter-stage matching network, or output matching network by similar means.

Figure 13A:
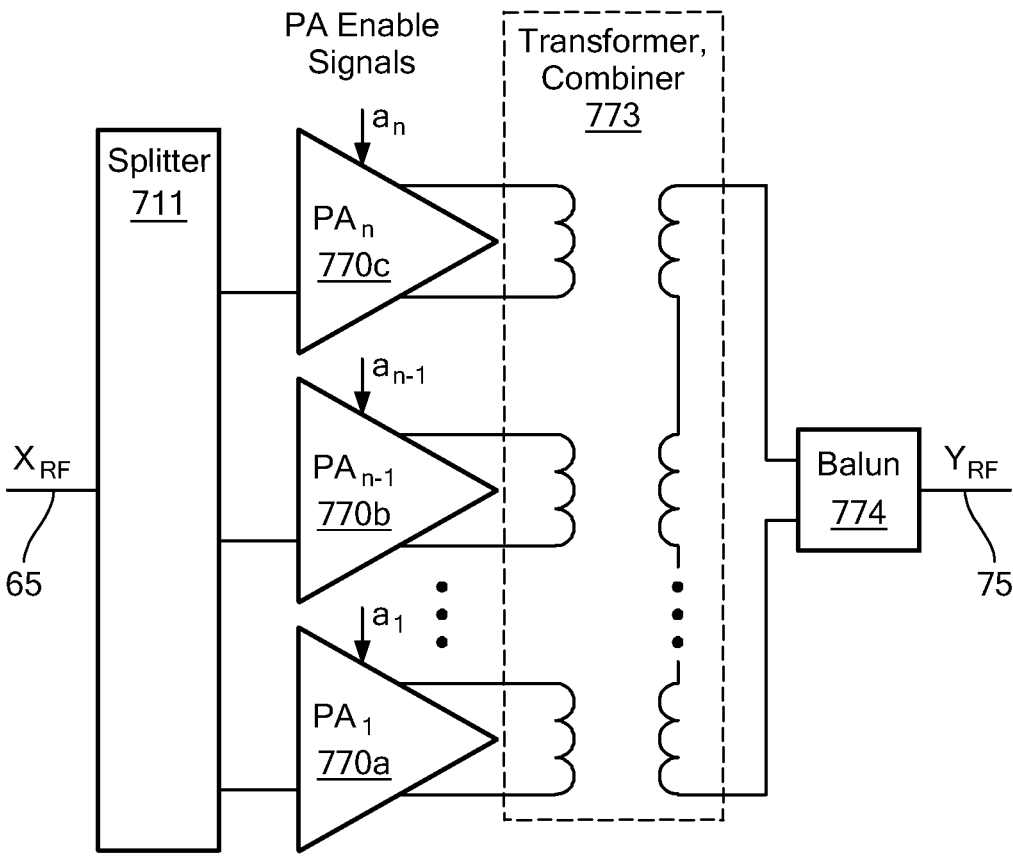
FIG. 13A is a block diagram showing an example of a multi-PA RF transmitter, according to some embodiments.
Figure 13B:
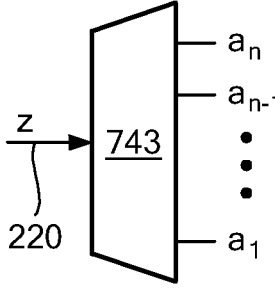
FIG. 13B is a block diagram showing a multiplexer for generating PA enable signals.

In reference to FIG. 13A-B in which like elements of FIG. 2A are show using like reference designations, there exist methods of combining individual RF PA cells (shown as 770$a$-$c$ in FIG. 13A) to produce increased output power, enhance efficiency, or achieve other RF performance benefits. An input RF signal may be split into n paths using an RF splitter 771 and combiner 773. Such components are known in the art and may take the form of a Wilkinson combiner, a 90-degree hybrid combiner, a transformer, or other combiner structure. The combiner 773 may be implemented by a variety of components known in the art including lumped circuit elements, transmission lines, resonators, waveguides, or a combination thereof. In some embodiments, the plurality of PA cells 770$a$-$c$ may include at least a first PA cell and a second PA cell, the first PA cell is configured to receive a first one of the one or more RF signals as input, the second PA cell is configured to receive a second one of the one or more RF signals as input. In some embodiments the first and second RF signals may be the same and/or different signals depending on the design. The multi-PA controller may be configured to independently control the first and second PA cells. In some embodiments the transmit chain comprises a splitter configured to receive an input RF signal and to provide the plurality of RF signals as amplitude-adjusted and/or phase-adjusted versions of the input RF signal.

In another example of multiple-PA transmitter, a so-called digital PA consists of n PA power stage units 770$a$-$c$ coupled to a common output node to produce the RF output signal 75 ($Y_{RF}$). The PA power stage units 770$a$-$c$ (770 generally) are shown with single-ended input and differential output, though input nor output are required to be differential or single-ended. The output of stage 770 may be combined using many means, for example the n:1 transformer 773 shown in FIG. 13A. Also shown in FIG. 13A. is a balun 774 used to convert differential output of the transformer 773 to single-ended output $Y_{RF}$ 775. Each power stage unit 770 may be activated or deactivated (e.g., switched in/out, powered on/off, or otherwise activated/deactivated) by PA enable signals $a_{1-n}$. For example, a given power state unit 770 may be enabled by closing an RF switch, adjusting an RF matching network, adjusting PA bias, or adjusting PA supply voltage. FIG. 13A is shown by way of illustration and not limitation. While three (3) power stage units 770 are shown in FIG. 13A, other numbers of power stage units can be provided.

FIG. 13B shows an embodiment of a multiplexer 743 for generating the PA enable signals $a_{1-n}$ from digital control signal 220. Digital control signal 220 may be generated, for example, by a state actuation control 202 of FIG. 2A. As mentioned above, PA enable signals $a_{1-n}$ may enable and/or disable, in full and/or in part, each of one or more power stage units 770 to be combined.

When only one power stage unit 770 is enabled, the baseline level RF power is observed at the output. For example, when only power stage 770$c$ is enabled, the baseline RF power 0 db will be observed at the output. The effect of enabling additional power stage units depends on the input/output signal amplitude and phase relationships between the power stage units. In one example, when two power stage units 770$c$, 770$b$ are enabled, the RF output power level increases by 3 dB from baseline. In yet another example, as one with skill in the art may appreciate, when four power stage units are enabled, output power is increased by 6 dB from baseline; and so on. The change in enable signal is accompanied by a change in the nonlinear characteristic (e.g., gain and phase) of the overall power stage.

A change in the configuration of enabled PA power stage units 770 can be commanded by a discrete digital control signal 220 (e.g., generated a state actuation control unit 202 of FIG. 2A), and simultaneously provided to the actuation circuit 204 and appropriate preprocessing unit 402 (for example one of those illustrated in FIG. 4B). The preprocessing block transforms the digital control signal 220 into an input signal provided to a nonlinear combiner (for example, the nonlinear combiner 404 of FIG. 4B) to compensate for the change in nonlinear characteristic due to enabling additional PA units.

The splitter 711 and combiner 773 can be designed to provide a given amplitude and phase relationship among the two or more PA input terminals, and a given phase relationship among the two or more PA output terminals. It is appreciated herein that adjustment of input/output signal amplitude and phase provided to one of a plurality of combined PAs may adjust overall RF performance. In one example, outphasing techniques use a phase relationship between two combined PA paths as a method of controlling the signal amplitude at combiner output while maintaining PA compression, and thus high efficiency. In another example, Doherty amplifiers use an input phase offset and output phase offset for multiple combined PAs (along with unique bias control) to dynamically adjust the load impedance at each of the PA output stage transistors and maintain high efficiency at reduced instantaneous output power.

Figure 13C:
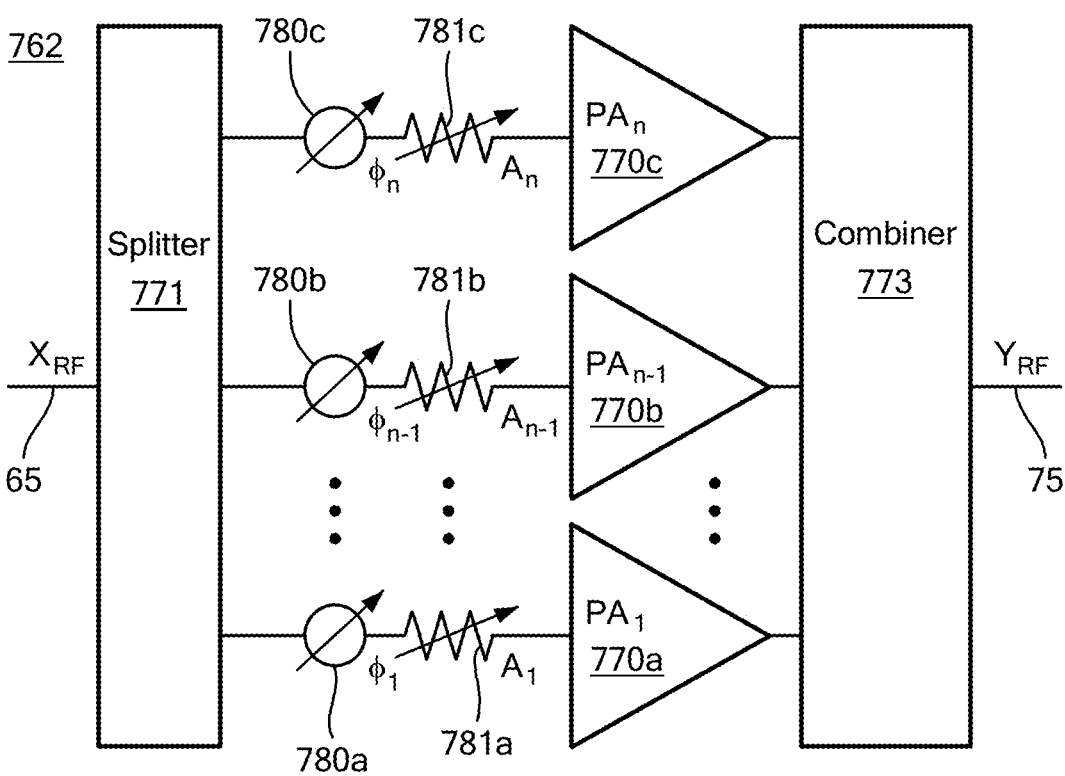
FIG. 13C is a block diagram showing an example of a multi-PA RF transmitter, according to some embodiments.
Figure 13D:
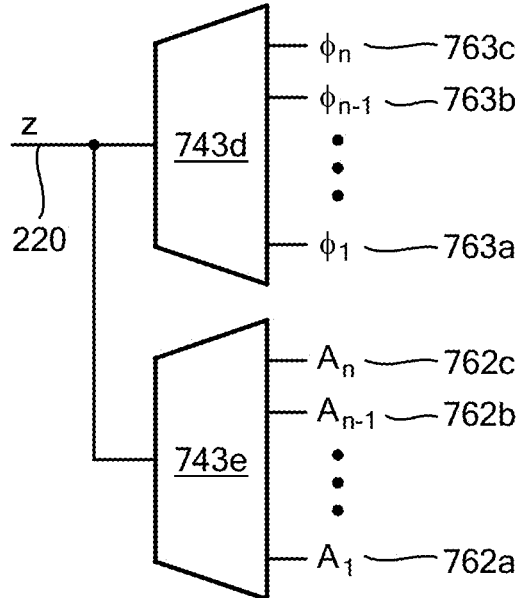
FIG. 13D is a block diagram showing a multiplexer for generating amplitude and phase control signals.

The amplitude and phase relationship may be fixed or reconfigurable. Reconfiguration of the amplitude or phase of a given input or output path may be achieved using reconfigurable matching element under the influence of a control signal (e.g., control signal 220) as described herein. FIG. 13C shows an embodiment of a multi-PA cell system 762 having amplitude and phase control. The multi-PA system includes amplitude shifters 781a-c and phase shifters 780a-c for amplitude and phase adjustments of the input signals. FIG. 13D shows at least one multi-PA controller 743d,e for implementing amplitude and phase control. The at least one multi-PA controller 743d,e generates a plurality of amplitude adjustment signals 762a-n and a plurality of phase adjustment signals 763a-n from a control signal 220. The at least one multi-PA controller 743b,c is configured to adjust an amplitude and/or a phase of the one or more RF signals received as input by the plurality of PA cells. In some embodiments, the splitter 771 can be configured to receive an input RF signal and to provide the plurality of RF signals as amplitude-adjusted and/or phase-adjusted versions of the input RF signal. As one with skill in the art may appreciate, some embodiments may include enable signals $a_{1-n}$, amplitude shifters 781a-c, and/or phase shifters 780a-c.

One or more state actuation circuits 204 (e.g., circuits for adjusting supply voltage, gate bias, RMN) of one or more PA power stage units 770 may have coordinated adjustments for the purpose of achieving desired RF performance (e.g., linearity, efficiency, robustness). In the case of multi-PA transmitters, the adjustment of state actuation circuits for each PA unit may be coordinated with enabling or disabling PA units. Adjustment of each PA element may be made using a shared or a unique control signal (e.g., control signal 220). Each control signal may be produced by a shared or a unique state actuation control unit (e.g., control unit 202). Each control signal may be provided to a shared or unique preprocessing block 420 in the DPD 400 for incorporation into the pre-distorted signal 122 which will be provided to the PA or PA units. The DPD acts to linearize the RF output signal 75 ($Y_{RF}$) in the presence of adjustments made by the actuation circuits.

Figure 14A:
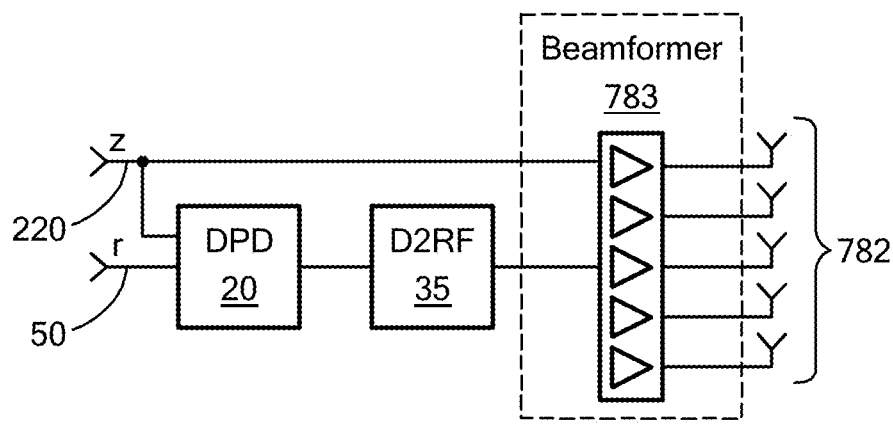
FIG. 14A is a block diagram showing an example transceiver including a beamformer and antenna array.

As shown in FIG. 14A-D, in some embodiments, a state actuation control unit (e.g., control unit 202 of FIG. 2A) may be configured to generate a control signal 220 (z) for steering a beamforming array of radiating elements. For example, a transceiver may include a beamformer 783 and one or more antenna array elements 782a-c (782 generally). The beamformer 783 may be in part comprised of RF phase shifters 780a-c, RF amplitude attenuators 781a-c, and/or RF variable gain amplifiers (not shown). Controls signal 220 may be used, for example, to adjust the relative phase and amplitude of adjacent radiating elements, causing increased radiated directivity in one or more directions. That is, one or more "beams" of radiated energy can be "formed" and the beam or beams may be "steered" in a given direction. Also shown in FIG. 14A is DPD 20 and digital-to-RF converter 35.

Figure 14B:
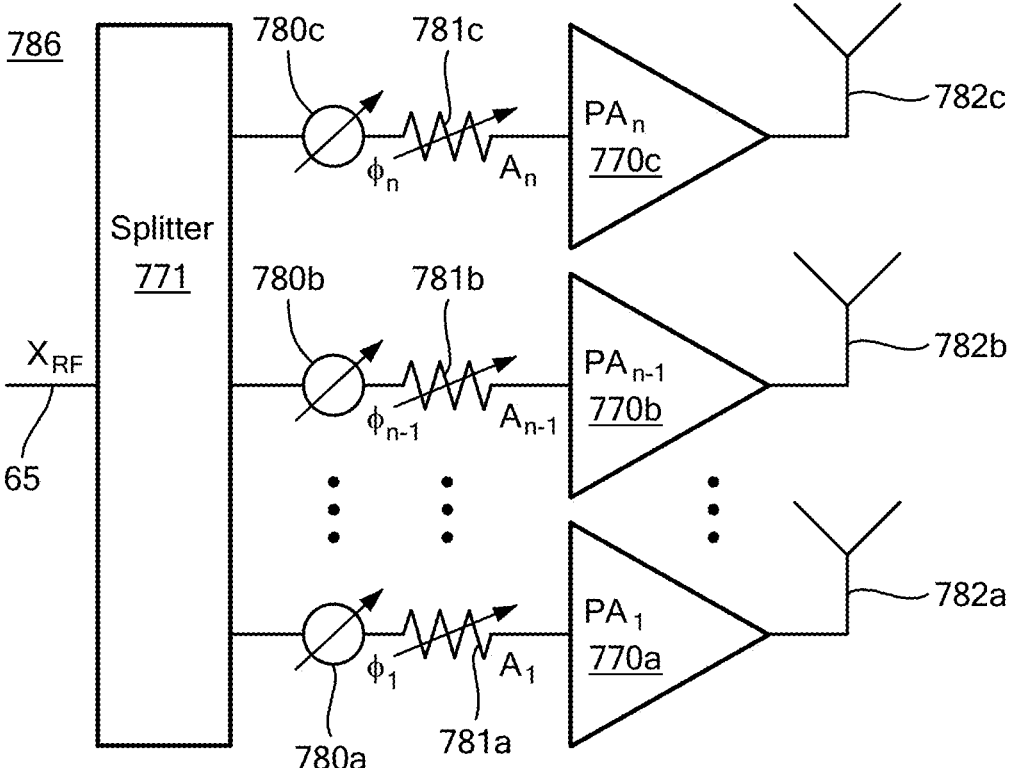
FIG. 14B is a block diagram showing a pre-PA beamformer.
Figure 14C:
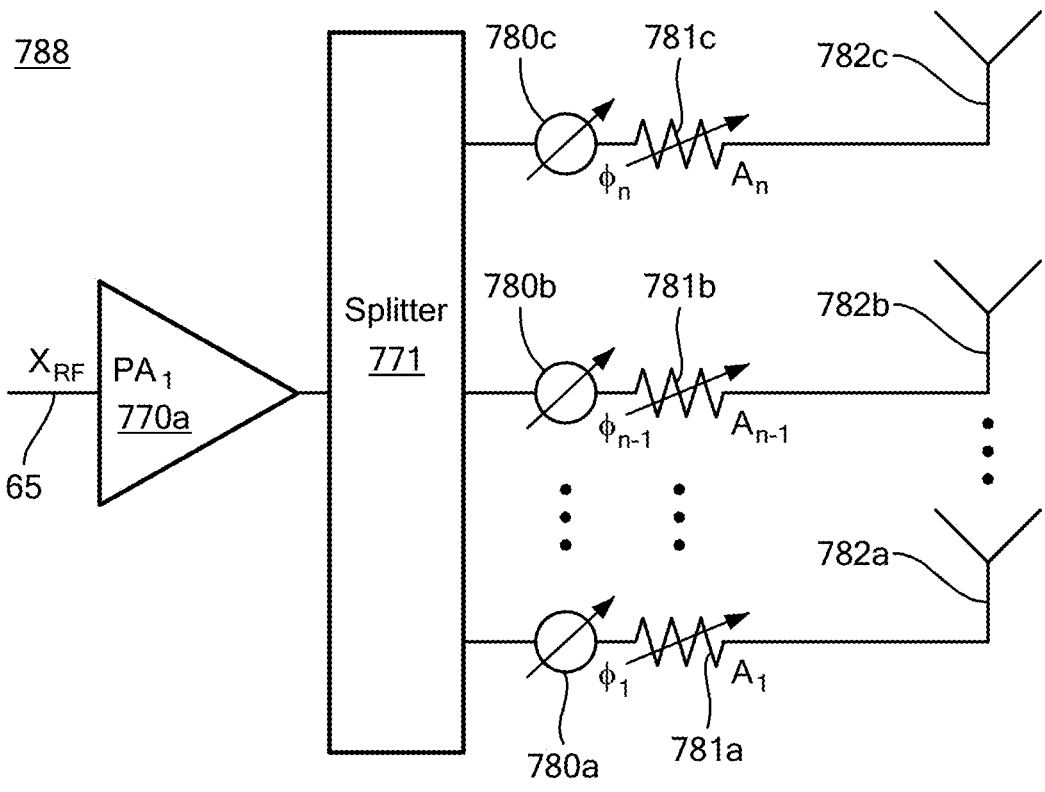
FIG. 14C is a block diagram showing a post-PA beamformer.

In some embodiments, beamformer elements 780a-c, 781a-c, etc. may be located between a DPD (e.g., DPD 102 of FIG. 2A) and the one or more PAs 770a-c in a "pre-PA" beamformer configuration 786, such as shown in FIG. 14B. In other embodiments, beamformer elements 780a-c, 781a-c, etc. may be located between at least one PA 770a and one or more antenna elements 112 in a "post-PA" beamformer configuration 788, as shown in FIG. 14C. Either beamform configuration 786, 788 may correspond to beamformer 783 of FIG. 14A. An RF splitter 771 may be provided to divide a single input RF signal 65 into multiple paths routed to different phase shifting and amplitude adjusting elements 780a-c and 781a-c, respectively, as shown in FIG. 14. A state actuation circuit (e.g., circuit 204 of FIG. 2A) may be connected to the beamformer 783 and configured to modulate the direction of one or more beams. In this case, the state actuation circuit may be referred to as a beamforming array controller or simply a beamformer controller.

Modulating the beam direction may introduce distortions to the transmitted signal. For example, the beamformer's nonideality (e.g., nonlinear effects of phase shifters implemented by switches) may introduce nonlinearity prior to the PA stages ("pre-PA" configuration of FIG. 14B) or after the PA stage ("post-PA" configuration of FIG. 14C). In either case, the beamformer may add distortion (e.g., change in nonlinearity due to phase shifter angle adjustment or attenuator attenuation adjustment, frequency response of the RF splitter, etc.). Distortion introduced by the beamformer may vary depending on the selected beam direction or angle.

Modulating beam direction may also have an effect on insertion loss (e.g., attenuation or gain independent of envelope amplitude) and/or insertion phase (e.g., phase contribution independent of envelope amplitude) of beamformer components. The change in insertion loss and/or phase may result in discontinuities of the transmitted waveform when the beam direction is modulated. In some embodiments the beamformer and radiating array of FIG. 14A may itself be a sub-array within a larger array. Similar to the single array, this larger array uses a relative amplitude and/or phase relationship among the sub-arrays to further increase directivity of one or more beams. The change of insertion loss and/or phase when a sub-array beam is steered may impact the performance of the larger array.

In addition to nonlinearities introduced in the transmit path by elements of the beamformer (e.g., nonlinear characteristics of individual PAs connected to antennas radiating in close proximity) may also change as the beam direction is modulated. The RF signal of one antenna array element (e.g., element 782c) couples to another antenna array element (e.g., element 782b) with some phase and amplitude relationship creating an impedance mismatch at each PA. The change in PA impedance is in part responsible for the change in the nonlinear characteristic of each PA.

Figure 14D:
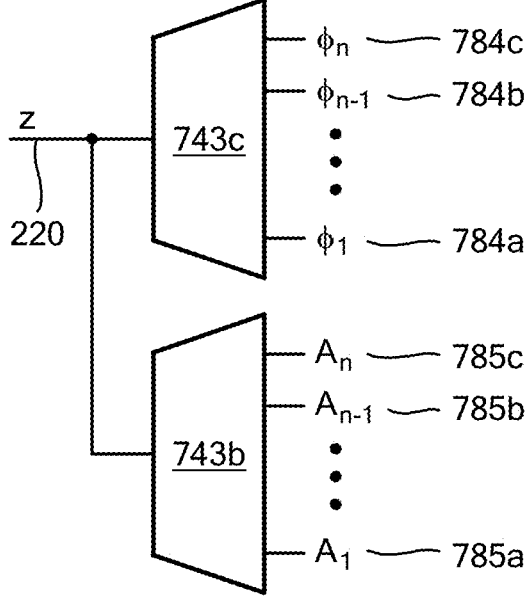
FIG. 14D is a block diagram showing a multiplexer for generating beamformer control signals.

Turning to FIG. 14D, shows a first example of a beamformer controller wherein the beamformer control signal 220 (z) is input to one or more multiplexers (e.g., multiplexers 743b,c), a LUT, or other combinatorial logic to produce phase shifting control signals 784a-c, amplitude control signals 785a-c (as shown), and/or other beamformer element adjustments (not shown), for the beamformer 783 in FIG. 14A and/or beamformer configuration 786 of FIG. 14B. In some examples, phase shifting control signals 784a-c may be provided as inputs to RF phase shifters 780a-c and/or RF amplitude attenuators 781a-c of FIG. 14B and/or FIG. 14C and in some embodiments may collectively steer at least one beam radiated from a beamforming array.

In some embodiments, beamformer control signal 220 (z) may connected to or otherwise provided to one or more pre- and/or post-processing blocks of DPD 20 of FIG. 14A to pre-distort the behavior of at least one of the following, all of which may change with beam modulation: nonlinearity or frequency response of beamformer elements, beamformer insertion gain and/or insertion phase, and/or PA nonlinearity due to coupling of radiating elements. FIG. 9 also illustrates an exogenous input scan angle 906d entering a preprocessing block 904d of the DPD 900. Scan angle 906d may be commanded by the modem and indicate the desired beamforming direction, and result in a beamformer control signal 220. Input scan angle 906d and control signal 220 may be substantially the same or one may be an abstracted modem command while control signal 220 is a hardware control signal. DPD 900 may pre-process and use as input any command or signal correlated with the change in beamformer behavior. Preprocessing block 904*d* may receive the scan angle 906*d* or a translated version thereof and in some embodiments be a LUT configured to translate the scan angle into a digital representation of an analog response of the beamformer. The preprocessing block 904*d* is then configured to provide the preprocessed signal to the nonlinear combiner 404 for combination with at least one of the other input signals to generate the pre-distorted signal 122 (*x*).

In some embodiments, a beamformer may include a circuital arrangement that splits a RF input signal into one input for each element of an array of antenna elements, and then makes phase and/or amplitude adjustments to the RF signal for each element. In some embodiments, a beamforming array may include a beamformer and an array of one or more antenna elements. In some embodiments, a beamformer controller may include a control block that determines what phase and/or phase adjustment to apply for each element's RF input signal based on a desired scan angle. As used herein, scan angle can refer to a configuration of phase and/or amplitude adjustments of a beamformer that determines direction of one or more beams propagating from a beamforming array.

It should be noted that the nonlinear effects of the digital-to-RF converter (e.g., converter 106 in FIG. 2A and/or converter 35 in FIG. 14A) may also be compensated at least in part through the post-processing block 450 shown in FIG. 4B.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures but should be understood.

The subject matter described herein can be implemented in digital electronic circuitry, or in computer software, firmware, or hardware, including the structural means disclosed herein and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this disclosure, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It should be appreciated that individual elements of different embodiments and/or figures described herein may be combined to form other embodiments not specifically set forth above. Various elements, which are described in the context of a single embodiment or figure, may also be provided separately or in any suitable sub-combination. It should also be appreciated that other embodiments not specifically described herein are also within the scope of the following claims.

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

References in the disclosure to "one embodiment," "an embodiment," "some embodiments," or variants of such phrases indicate that the embodiment(s) described can include a particular feature, structure, or characteristic, but every embodiment can include the particular feature, structure, or characteristic. Moreover, such phrases are not necessarily referring to the same embodiment(s). Further, when a particular feature, structure, or characteristic is described in connection knowledge of one skilled in the art to affect such feature, structure, or characteristic in connection with other embodiments whether or not explicitly described.

The disclosed subject matter is not limited in its application to the details of construction and to the arrangements of the components set forth in the following description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

All publications and references cited herein are expressly incorporated by reference in their entirety.

The invention claimed is:

1. In a radio frequency (RF) transceiver system having a transmit chain and a digital pre-distorter (DPD), a control unit comprising:
   one or more inputs, at least one of which is connected to receive a first signal corresponding to a signal to be transmitted via the transmit chain or a modified version of the signal to be transmitted; and
   an output connected to provide a control signal to the DPD, and to a reconfigurable matching network (RMN) for commanding a reconfiguration of the RMN, wherein the DPD is configured to apply digital predistortion to the signal to be transmitted based at least in part on combining the first signal with a second signal corresponding to the control signal or a translated version thereof, and to provide a resulting pre-distorted signal to the transmit chain.

2. The control unit of claim 1 further comprising circuitry configured to generate the control signal.

3. The control unit of claim 1 wherein the RMN comprises at least one of:
   an output matching network (OMN);
   an input matching network (IMN); and
   an inter-stage impedance matching network (ISMN).

4. The control unit of claim 3 wherein the control signal comprises an index signal having a discrete sequence of values taken from a predetermined set of values, wherein the transceiver system comprises a state actuation circuit to convert the index signal to an output signal applied to produce an analog response in one or more components of the transmit chain.

5. The control unit of claim 4 wherein the output is connected to the DPD via one or more preprocessing blocks configured to translate the index signal to a digitized analog signal correlated with the analog response produced in the one or more components of the transmit chain, wherein the DPD is configured to apply the digital predistortion to the signal to be transmitted based at least in part on combining the signal to be transmitted with the digital analog signal.

6. The control unit of claim 1 wherein the RMN comprises a reconfigurable matching element arranged in series or parallel with another matching network element.

7. The control unit of claim 6 wherein the RMN is a first state actuation circuit and the transceiver system further has a second state actuation circuit.

8. The control unit of claim 7 wherein the second state actuation circuit comprises a power management circuit (PMC) for supply modulation.

9. The control unit of claim 8 wherein the transceiver system further has a power amplifier (PA) and the RMN is configured to modulate load impedance of the PA.

10. The control unit of claim 7 wherein the DPD is configured to apply digital predistortion to the first signal based at least in part on combining the first signal with the second signal and with a second control signal for the second state actuation circuit or a translated version thereof.

11. The control unit of claim 1 wherein the RMN comprises at least one of the following:
   a microelectromechanical system (MEMS) switch;
   a PIN diode;
   a solid-state switch; and
   a varactor.

12. The control unit of claim 1 wherein the RMN comprises an adjustable RMN.

13. The control unit of claim 1 wherein the RMN is configured to be set to one of two or more discrete states.

14. The control unit of claim 13 wherein the RMN is configured to change from one state to another in less than 1 microsecond.

15. The control unit of claim 13 wherein the control signal corresponds to a state of the RMN, and the RMN is configured to decoded the control signal to produce one or more control signals for one or more elements of the RMN.

16. The control unit of claim 15 wherein the RMN is configured to decode the control signal using at least one of the following:
   combinational logic;
   a look-up table (LUT); and
   a state machine.

17. The control unit of claim 1 wherein a state of the RMN is responsive at least in part to a system condition.

18. The control unit of claim 17 wherein the system condition comprises at least one of:
   a temperature;
   a voltage standing wave ratio (VSWR); and
   a beamformer scan angle.

19. The control unit of claim 1 wherein the control signal is a first control signal, wherein a state of the RMN is responsive at least to first control signal and a second control signal.

20. The control unit of claim 19 wherein the second control signal corresponds at least in part to a supply voltage of one or more transistors.

21. The control unit of claim 19 wherein the second control signal corresponds at least in part to a bias voltage or current of one or more transistors.

22. The control unit of claim 1 wherein a state of the RMN is responsive at least in part to one or more characteristics of the signal to be transmitted.

23. The control unit of claim 22 wherein the one or more characteristics of the signal to be transmitted comprises at least one of:

an average RF output power;

an RF center frequency;

a peak-to-average ratio; and an RF signal bandwidth.

24. The control unit of claim 1 wherein a state of the RMN is responsive at least in part to one or more of an instantaneous amplitude of the signal to be transmitted signal amplitude or a pre-distorted version thereof.

25. The control unit of claim 1 wherein the DPD comprises at least one processing block arranged to process the control signal.

26. The control unit of claim 25 wherein the processing block comprises a filter.

27. The control unit of claim 26 wherein the filter is implemented at least in part as an finite impulse-response (FIR) filter.

28. The control unit of claim 26 wherein the filter is configured to model at least a change in gain and phase of the transmit chain due to the reconfiguration the RMN.

29. The control unit of claim 25 wherein the processing block implements a nonlinear transformation.

30. The control unit of claim 25 wherein the processing block comprises a look-up table.

31. In a radio frequency (RF) transceiver system having a transmit chain, a control unit, and a reconfigurable matching network (RMN), a digital pre-distorter (DPD) comprising:

a plurality of inputs including at least:

a first input to receive a first signal corresponding to a signal desired to be transmitted via the transmit chain or a modified version of said signal, and a second input connected to the control unit to receive a second signal corresponding to a control signal for commanding a reconfiguration of the RMN or a translated version of the control signal;

circuitry configured to apply digital predistortion to the signal desired to be transmitted based at least in part on combining the first and second signals; and an output connected to provide a resulting pre-distorted signal to the transmit chain.

32. The DPD of claim 31 wherein the RMN is part of an output matching network (OMN), an input matching network (IMN), or an inter-stage impedance matching network (ISMN).

33. The DPD of claim 32 wherein the control signal comprises an index signal having a discrete sequence of values taken from a predetermined set of values, wherein the transceiver system comprises a state actuation to convert the index signal to an output signal applied to produce an analog response in one or more components of the transmit chain.

34. The DPD of claim 33 wherein the output is connected to the DPD via one or more preprocessing blocks configured to translate the index signal to a digitized analog signal correlated with the analog response produced in the one or more components of the transmit chain, wherein the DPD is configured to apply the digital predistortion to the signal to be transmitted based at least in part on combining the signal to be transmitted with the digital analog signal.

35. The DPD of claim 31 wherein the RMN comprises a reconfigurable matching element arranged in series or in parallel with another matching network element.

36. The DPD of claim 31 wherein the RMN comprises at least one of the following:

a MEMS switch;

a PIN diode;

a solid-state switch; and a varactor.

37. The DPD of claim 31 wherein the RMN comprises an adjustable RMN.

38. The DPD of claim 31 wherein the RMN is configured to be set to one of two or more discrete states.

39. The DPD of claim 38 wherein the RMN is configured to change from one state to another in less than 1 microsecond.

40. The DPD of claim 38 wherein the control signal corresponds to a state of the RMN.

41. The DPD of claim 39 wherein the control signal corresponds to a state of the RMN, and the RMN is configured to decode the control signal to produce one or more control signals for one or more elements of the RMN.

42. The DPD of claim 41 wherein the RMN is configured to decode the control signal using at least one of the following:

combinational logic;

a look-up table; and a state machine.

43. The DPD of claim 31 wherein a state of the RMN is responsive at least in part to a system condition.

44. The DPD of claim 43 wherein the system condition comprises at least one of:

a temperature;

a voltage standing wave ratio (VSWR); and a beamformer scan angle.

45. The DPD of claim 31 wherein the control signal is a first control signal, wherein a state of the RMN is responsive at least to first control signal and a second control signal.

46. The DPD of claim 45 wherein the second control signal corresponds at least in part to a supply voltage of one or more transistors.

47. The DPD of claim 45 wherein the second control signal corresponds at least in part to a bias voltage or current of one or more transistors.

48. The DPD of claim 31 wherein a state of the RMN is responsive at least in part to one or more characteristics of the signal to be transmitted.

49. The DPD of claim 48 wherein at least one of the one or more characteristics of the signal to be transmitted comprises at least one of the following:

an average RF output power;

an RF center frequency;

a peak-to-average ratio; and an RF signal bandwidth.

50. The DPD of claim 31 wherein a state of the RMN is responsive at least in part to one or more of an instantaneous amplitude of the signal to be transmitted signal amplitude or a pre-distorted version thereof.

51. The DPD of claim 31 wherein the DPD comprises at least one processing block arranged to process the control signal.

52. The DPD of claim 51 wherein the processing block comprises a filter.

53. The DPD of claim 52 wherein the filter is implemented at least in part as an finite impulse-response (FIR) filter.

54. The DPD of claim 52 wherein the filter is configured to model at least a change in gain and phase of the transmit chain due to the reconfiguration the RMN.

55. The DPD of claim 51 wherein the processing block implements a nonlinear transformation.

56. The DPD of claim 51 wherein the processing block comprises a look-up table.

57. In a radio frequency (RF) transceiver system having a transmit chain, and a reconfigurable matching network (RMN), a digital pre-distorter (DPD) comprising:

a plurality of inputs including at least:

a first input to receive a first signal corresponding to a signal desired to be transmitted via the transmit chain or a modified version of said signal, and a second input to receive a second signal corresponding to a signal exogenous to the first signal or a translated version of the exogenous signal;

circuitry configured to apply digital predistortion to the signal desired to be transmitted based at least in part on combining the first and second signals; and an output connected to provide a resulting pre-distorted signal to the transmit chain.

\* \* \* \* \*